(12) United States Patent
Lewinski et al.

(10) Patent No.: US 7,740,962 B2
(45) Date of Patent: Jun. 22, 2010

(54) COMPACT FUEL CELL STACK WITH CURRENT SHUNT

(75) Inventors: Krzysztof A. Lewinski, Mahtomedi, MN (US); Kim B. Saulsbury, Lake Elmo, MN (US); Mark K. Debe, Stillwater, MN (US); Andrew J. L. Steinbach, Minneapolis, MN (US); Thomas Herdtle, Inver Grove Heights, MN (US); Edward M. Fischer, White Bear Lake, MN (US); Michael A. Yandrasits, Hastings, MN (US); Hamid R. Mortazavi, Woodbury, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 0 days.

(21) Appl. No.: 11/567,644

(22) Filed: Dec. 6, 2006

(65) Prior Publication Data
US 2008/0138666 A1    Jun. 12, 2008

(51) Int. Cl.
 H01M 8/00 (2006.01)
 H01M 2/14 (2006.01)
(52) U.S. Cl. .......................... 429/12; 429/38
(58) Field of Classification Search .............. 429/12
 See application file for complete search history.

(56) References Cited

U.S. PATENT DOCUMENTS

| | | | |
|---|---|---|---|
| 5,484,666 A * | 1/1996 | Gibb et al. .................. 429/34 |
| 6,065,630 A * | 5/2000 | Outwater .................... 220/327 |
| 6,669,826 B1 | 12/2003 | Milgate, Jr. et al. |
| 6,828,055 B2 | 12/2004 | Kearl |
| 2003/0008194 A1 | 1/2003 | Cargneli et al. |
| 2003/0186106 A1* | 10/2003 | Frank et al. .................. 429/38 |
| 2003/0203254 A1* | 10/2003 | Bai et al. ..................... 429/23 |
| 2004/0043279 A1 | 3/2004 | Rapaport et al. |
| 2004/0096725 A1 | 5/2004 | Mao et al. |
| 2004/0115513 A1 | 6/2004 | Yang |
| 2004/0253499 A1* | 12/2004 | Sato et al. ................... 429/32 |
| 2005/0095485 A1* | 5/2005 | Saulsbury et al. ............ 429/32 |
| 2005/0112442 A1 | 5/2005 | Wells et al. |
| 2005/0112449 A1* | 5/2005 | Mathias et al. ............... 429/44 |
| 2005/0118491 A1 | 6/2005 | Ramsey et al. |
| 2005/0170235 A1 | 8/2005 | Hu et al. |
| 2006/0012334 A1* | 1/2006 | Watson ....................... 320/112 |
| 2006/0048540 A1 | 3/2006 | Voss et al. |
| 2006/0110647 A1 | 5/2006 | Sherman et al. |

(Continued)

FOREIGN PATENT DOCUMENTS

DE    10 2004 015601    10/2005

(Continued)

*Primary Examiner*—Patrick Ryan
*Assistant Examiner*—Muhammad Siddiquee
(74) *Attorney, Agent, or Firm*—William Ashley; Philip Y. Dahl

(57) ABSTRACT

A fuel cell assembly includes first and second compression members. Two or more membrane electrode assembly (MEA) stacks are disposed between the compression members, each MEA stack having a positive and negative end. A first current collector is electrically coupled to a positive end of a first stack of the MEA stacks. A second current collector is electrically coupled to a negative end of a second stack of the MEA stacks. A current shunt is disposed between the compression members and electrically couples the MEA stacks.

29 Claims, 15 Drawing Sheets

U.S. PATENT DOCUMENTS

2006/0199054 A9 * 9/2006 Gallagher et al. ............ 429/26

FOREIGN PATENT DOCUMENTS

| EP | 1 403 951 A2 | 3/2004 |
| EP | 1 519 436 A1 | 3/2005 |
| EP | 1 734 604 A1 | 12/2006 |
| JP | 2005 276736 A | 10/2005 |
| WO | WO 96/19015 | 6/1996 |
| WO | WO 2004/023588 A1 | 3/2004 |
| WO | WO 2004/025769 A2 | 3/2004 |
| WO | WO 2006/070892 A1 | 7/2006 |
| WO | WO 2006/085172 A2 | 8/2006 |
| WO | WO 2006/105714 A1 | 10/2006 |

* cited by examiner

COMPACT FUEL CELL STACK WITH CURRENT SHUNT

FIELD OF THE INVENTION

This invention relates in general to fuel cells, and in particular to fuel cells using membrane electrode assembly stacks.

BACKGROUND

A typical fuel cell system includes a power section in which one or more fuel cells generate electrical power. A fuel cell is an energy conversion device that converts hydrogen and oxygen into water, producing electricity and heat in the process. Each fuel cell unit may include a proton exchange member (PEM) at the center with gas diffusion layers on either side of the proton exchange member. Anode and cathode catalyst layers are respectively positioned at the inside of the gas diffusion layers. This unit is referred to as a membrane electrode assembly (MEA). Separator plates (also referred to herein and flow field plates or bipolar plates) are respectively positioned on the outside of the gas diffusion layers of the membrane electrode assembly. This type of fuel cell is often referred to as a PEM fuel cell.

The reaction in a single MEA typically produces less than one volt. Therefore, to obtain operating voltages useful in most applications, a plurality of the MEAs may be stacked and electrically connected in series to achieve a desired voltage. Electrical current is collected from the fuel cell stack and used to drive a load. Fuel cells may be used to supply power for a variety of applications, ranging from automobiles to laptop computers.

It is recognized that for certain applications, such as stacks used for automotive drives, there are limitations with existing PEM Fuel Cells due to excessive weight, volume, and cost. One reason for this is due to the thickness and weight of the flow field separators. Machined graphite, carbon composite, and metals are materials commonly used for flow field separators. These material options may suffer from either excessive volume or weight. This limitation leads to heavy or bulky fuel cell stacks, as typically there are many separators in each stack. Furthermore, it is difficult to make these separators thin and robust. Breakage and cracking have been issues with graphite and carbon composite based separators. Small defects can lead to breakage and catastrophic failures. Thin, light weight metal plate separators can bend easily and remain deformed. There have been many attempts to improve the performance of flow field separators, but it has been difficult to find a good balance between cost, thickness, weight, and toughness.

Even where the thickness of the flow field separators can be reduced, there are still space constraints in some applications that make it difficult to adapt fuel cells to practical designs. For example, some electric drive motors used in automobile applications may require electrical potentials as high as 100 volts or more. In order for a fuel cell system to provide this potential without expensive power conversions, the fuel cell stack would require a large number of MEAs stacked together, making the fuel cell stack larger than desirable.

Other design requirements limit how compact a fuel cell system can be. For example, gases and fluids need to flow through the stack in order to power the cells and to regulate the cell temperature. The internal flow passages and external plumbing needed to accommodate these gases and fluids may make it difficult to produce a fuel cell assembly that is easy to integrate in a space-constrained environment such as an automobile. However, the potential benefit resulting from practical, fuel cell powered automobiles is great, so cost effective and robust solutions to these limitations are desirable.

SUMMARY

The present disclosure is directed to methods, systems, and apparatus for forming a proton exchange membrane (PEM) fuel cell stack. In one embodiment of the invention, a fuel cell assembly includes first and second compression members. Two or more membrane electrode assembly (MEA) stacks are disposed between the compression members, each MEA stack having a positive and negative end. A first current collector is electrically coupled to a positive end of a first stack of the MEA stacks. A second current collector is electrically coupled to a negative end of a second stack of the MEA stacks. A current shunt is disposed between the compression members and electrically couples the MEA stacks.

In more particular embodiments, the fuel cell assembly further includes coolant passages to facilitate the flow of coolant through the MEA stacks in a direction between the first and second compression members. The coolant passages are arranged so that a region of closest contact between the MEA stacks that is directly coupled by the coolant is a region of lowest electrical potential difference between the MEA stacks. In one configuration, the MEA stacks are arranged side by side between the compression members so that each MEA stack has a polarity opposite of adjacent MEA stacks.

In other, more particular embodiments, the fuel cell assembly further includes one or more electrical insulation members between adjacent MEA stacks. The MEA stacks may include passages that distribute anode and cathode gases through the MEA stacks in a path between the first and second compression members. In such a configuration, the fuel cell assembly may further include tie-rods disposed within the MEA stacks, and the first and second compression members and the MEA stacks may be held together by the tie-rods. In one arrangement, the tie rods are placed within the passages that distribute the anode and cathode gases through the MEA stacks. The tie rods may be made of titanium.

In other, more particular embodiments, the first and second current collectors are disposed between the first compression member and the respective first and second stacks of the MEA stacks. In such a configuration, the current shunt may include a coupling plate disposed proximate to the second compression member and electrically coupling adjacent ends of at least two of the MEA stacks, such that one of the adjacent ends is a positive end and another of the adjacent ends is a negative end. In another configuration, the second compression member includes coolant inlet passages that facilitate delivering of liquid coolant to the MEA stacks, and coolant outlet passages that facilitate removing of liquid coolant from the MEA stacks. In yet another configuration, the first compression member includes gas inlet passages that facilitate delivering of the anode gases and the cathode gases to the MEA stacks and gas outlet passages that facilitate removing the anode gases and the cathode gases from the MEA stacks.

In other, more particular embodiments, edges of the first and second current collectors are in close proximity. In such an arrangement, the fuel cell assembly may further include an electrical insulation member between the edges of the first and second current collector. Further, the MEA stacks may include coolant passages that carry coolant through the MEA stacks in a direction between the first and second compression members, and the coolant passages are arranged to prevent fluid contact directly between the edges of the first and second current collectors.

In other, more particular embodiments, the first current collector is disposed between the first compression member and a first stack of the MEA stacks, and the second current collector is disposed between the second compression member and a second stack of the MEA stacks. In such an arrangement, the current shunt may include a first coupling plate disposed proximate to the first compression member and a second coupling plate proximate to the second compression member. Each of the first and second coupling plates electrically couple adjacent ends of at least two of the MEA stacks, where one of the adjacent ends is a positive end and another of the adjacent ends is a negative end.

In other, more particular embodiments, the first compression member includes gas inlet passages that facilitate delivering of anode gases and cathode gases to the MEA stacks, and gas outlet passages that facilitate removing of the anode gases and the cathode gases from the MEA stacks. Additionally, the second compression member includes coolant inlet passages that facilitate delivering of liquid coolant to the MEA stacks, and coolant outlet passages that facilitate removing of the liquid coolant from the MEA stacks. The gas inlet and outlet passages and coolant inlet and outlet passages may be perpendicular to a horizontal plane of the first and second compression members. The fuel cell assembly may also include an anode gas manifold having anode gas chambers coupled to a first set of the gas inlet and outlet passages via the first compression member and a cathode gas manifold having cathode gas chambers coupled to a second set of the gas inlet and outlet passages via the first compression member, such that the anode gas chambers are in close proximity to the cathode gas chambers. The anode and cathode gas chambers may include features to facilitate uniform distribution of the respective anode and cathode gases.

In other, more particular embodiments, the MEA stacks each include a plurality of plate assemblies stacked together. Each plate assembly includes an anode plate, a cathode plate, and an MEA disposed between the anode and cathode plates, and one of the anode and cathode plates is thinner than the other one. In another arrangement, at least one of the anode and cathode plates have first flow field features of a first uniform depth on a side facing the MEA and second flow field features of a second uniform depth on a side facing away from the MEA. The first and second uniform depths may be substantially the same.

In another embodiment of the invention, a fuel cell includes compression members arranged at first and second ends of the fuel cell and at least two membrane electrode assembly (MEA) stacks having electrically positive and negative ends. The MEA stacks are arranged side by side between the compression members. A current shunt is disposed internal to the fuel cell. The current shunt electrically connecting the MEA stacks is at the second end of the fuel cell. The fuel cell includes positive and negative electrical connections for the fuel cell. The positive and negative connections are arranged at the first end of the fuel cell. The fuel cell includes coolant passages to facilitate the flow of coolant through the MEA stacks in a direction between the first and second ends of the fuel cell. The coolant passages are arranged so that a region of closest contact between the MEA stacks that is directly coupled by the coolant is a region of lowest electrical potential difference between the at least two MEA stacks.

In more particular embodiments, the fuel cell further includes electrical insulation members between adjacent MEA stacks. The positive and negative electrical connections may be arranged at the first end of the fuel cell assembly so that edges of the first and second current collectors are adjacent. The compression member at the second end of the fuel cell may include coolant inlet and outlet passages coupled to the coolant passages of the MEA stacks. The fuel cell may include a coolant manifold at the second end of the fuel cell coupled to the coolant inlet and outlet passages of the compression member at the second end of the fuel cell.

In another embodiment of the invention, a method of making a fuel cell assembly involves arranging two or more membrane electrode assembly (MEA) stacks side by side. A first current collector is electrically coupled to a positive end of a first stack of the MEA cell stacks, and a second current collector is electrically coupled to a negative end of a second stack of the MEA stacks. A current shunt is coupled to electrically connect the MEA stacks. The MEA stacks, the first current collector, the second current collector, and the current shunt are compressed between a first and second compression member.

In more particular embodiments, compressing the MEA stacks, the first current collector, the second current collector, and the current shunt between the first and second compression member involves arranging the first and second current collector proximate to the first compression member and arranging the current shunt proximate to the second compression member. In this arrangement, the MEA stacks are disposed between the first and second current collectors at a first end of the fuel cell assembly and the current shunt at a second end of the fuel assembly. The MEA stacks may further include coolant passages that carry coolant through the MEA stacks, and the second compression member may include coolant inlet and outlet passages. In such an arrangement, the method further involves coupling the coolant inlet and outlet passages of the second compression member to the coolant passages of the MEA stack.

In other, more particular embodiments, compressing the MEA stacks may further involve connecting the first and second compression members using tie-rods that are disposed within the MEA stacks. Connecting the first and second compression members using tie-rods comprises placing the tie rods in passages of the MEA stacks that distribute anode and cathode gases through the MEA stacks. Connecting the current shunt may involve placing a coupling plate proximate to the second compression member and electrically coupling adjacent ends of at least two of the MEA stacks with the coupling plate. In such an arrangement, one of the adjacent ends is a positive end and another of the adjacent ends is a negative end.

In other, more particular embodiments, the method further involves placing one or more electrical insulation members between adjacent MEA stacks. Electrically coupling the first current collector to the positive end of the first stack may involve placing the first current collector between the first compression member and the first stack of the MEA stacks, and electrically coupling the second current collector to the negative end of the second stack involves placing the second current collector between the first compression member and the second stack of the MEA stacks.

In other, more particular embodiments, forming the MEA stacks involves stacking a plurality of plate assemblies together. Each plate assembly includes an anode plate, a cathode plate, and an MEA disposed between the anode and cathode plates, and one of the anode and cathode plates is thinner than the other one.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described representative examples of systems, apparatuses, and methods in accordance with the invention.

BRIEF DESCRIPTION OF THE DRAWINGS

The invention is described in connection with the embodiments illustrated in the following diagrams.

DETAILED DESCRIPTION OF EMBODIMENTS OF THE INVENTION

Figure 1A:
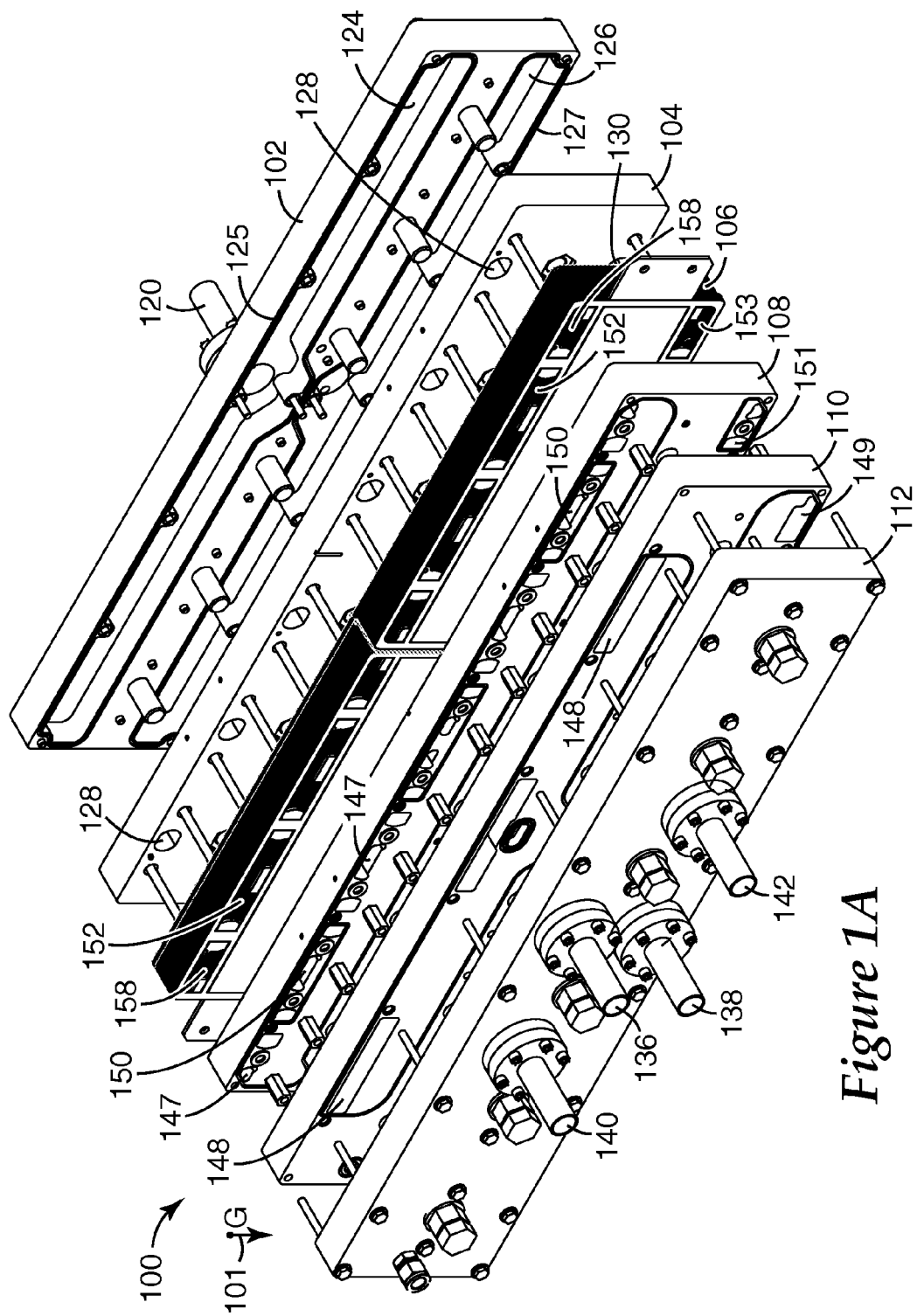
FIG. 1A is a front, perspective, exploded, view a fuel cell system according to embodiments of the invention.

In the following description of various exemplary embodiments, reference is made to the accompanying drawings that form a part hereof, and in which is shown by way of illustration various embodiments in which the invention may be practiced. It is to be understood that other embodiments may be utilized, as structural and operational changes may be made without departing from the scope of the present invention.

The present invention relates to fuel cell assemblies, and particular embodiments are described in the context of proton exchange member (PEM) fuel cell systems that are suitable for applications requiring high power densities and compact, lightweight packaging. Such applications include, but are not limited to, electric vehicle drive power, portable generators, vehicle power generators, or any other situation where the fuel cell stack might need to be small and light. In particular, mobile applications often require that the fuel cell system be compact and lightweight, and may impose form factors on the system that cannot be satisfied using traditional fuel cell stack designs.

Some features described in relation to embodiments of the present invention are intended to optimize the form factor of a fuel cell by reducing the dimension in the direction perpendicular to the plane of the fuel cell membranes. The size of this dimension is driven in part by the thickness of the stack of membrane electrode assemblies (MEAs) and separator plates positioned between the MEAs that form the fuel cell stack. This stack has a thickness defined by the nominal voltage of a single MEA, the required stack voltage, the thickness of the bipolar plates, and the thickness of the MEAs. Other components that may also add to the dimension of the final product. These components include current collectors electrically coupled to the ends of the stack, compression members that hold the stack together, and manifolds or other fluid-transport structures that deliver fuel, air, and coolant to the stack.

An example of how the dimensions of the stack components and voltage drive the ultimate stack system dimension, consider a hypothetical stack that must deliver approximately 100 volts using MEAs that nominally deliver 0.7 volts each. This will require 100/0.7=143 MEAs. Each plate assembly has an MEA sandwiched between a cathode plate and an anode plate. Except for plate assemblies at the end of the stack, the cathode plate of each plate assembly touches the anode plate of the adjacent plate assembly on one side, and the anode plate of the plate assembly touches the cathode plate of the plate assembly on the other side. Coolant is introduced between the touching cathode-anode plates of adjacent plate assembly. If the thickness of the plate assembly is 0.100 inches (0.254 cm) when compressed into the stack, then the thickness of the entire stack would be 143*0.10=14.3 inches (36.3 cm).

One approach to reducing the size of the stack is to reduce the thickness of the bipolar plates. Even reducing the thickness of each plate in the above example by 0.001 inches (0.00254 cm) will result in the total stack being reduced by (0.001+0.001)*143=0.286 inches (0.726 cm). However, there is a practical limit of how thin the plates can be made. The plates must contain small, closely spaced channels that distribute fluids to the gas diffusion layers (GDL) of the MEA, and must be thick enough to accommodate these channels. The plates must also have sufficient strength to prevent damage during assembly and failure during use. Some aspects of the present disclosure are directed towards reducing the thickness of the bipolar plates, and towards making the plates easier and cheaper to manufacture.

Even when thickness of the plates is reduced, the design parameters may still cause the thickness of fuel cell stack to be larger than desired. This is true where the stack voltage is relatively high, but the dimension of the system that includes the stack height (e.g., measured from positive to negative end of the stack) must be relatively small. Therefore, in order to accommodate such a design, the present disclosure describes a fuel cell that includes two or more stacks within a single pressure plate. The stacks may be arranged so that adjacent stacks have opposite polarities. One current collector is coupled to one end of a stack, and the other current collector is coupled to one end of another of the stacks. The stacks may be arranged so that adjacent stacks have opposite polarity.

This allows the ends of adjacent stacks (or at least those ends not coupled to a current collector) to be electrically shunted together, such as by using a coupling plate or bar. In this arrangement, the current stays within the stack assembly at all points except where it exits at the current collectors. Depending on the number of stacks used, the current collectors may be both on the same end of the fuel cell assembly, or there may be one collector on the first end, and the other collector on the second end.

Figure 1B:
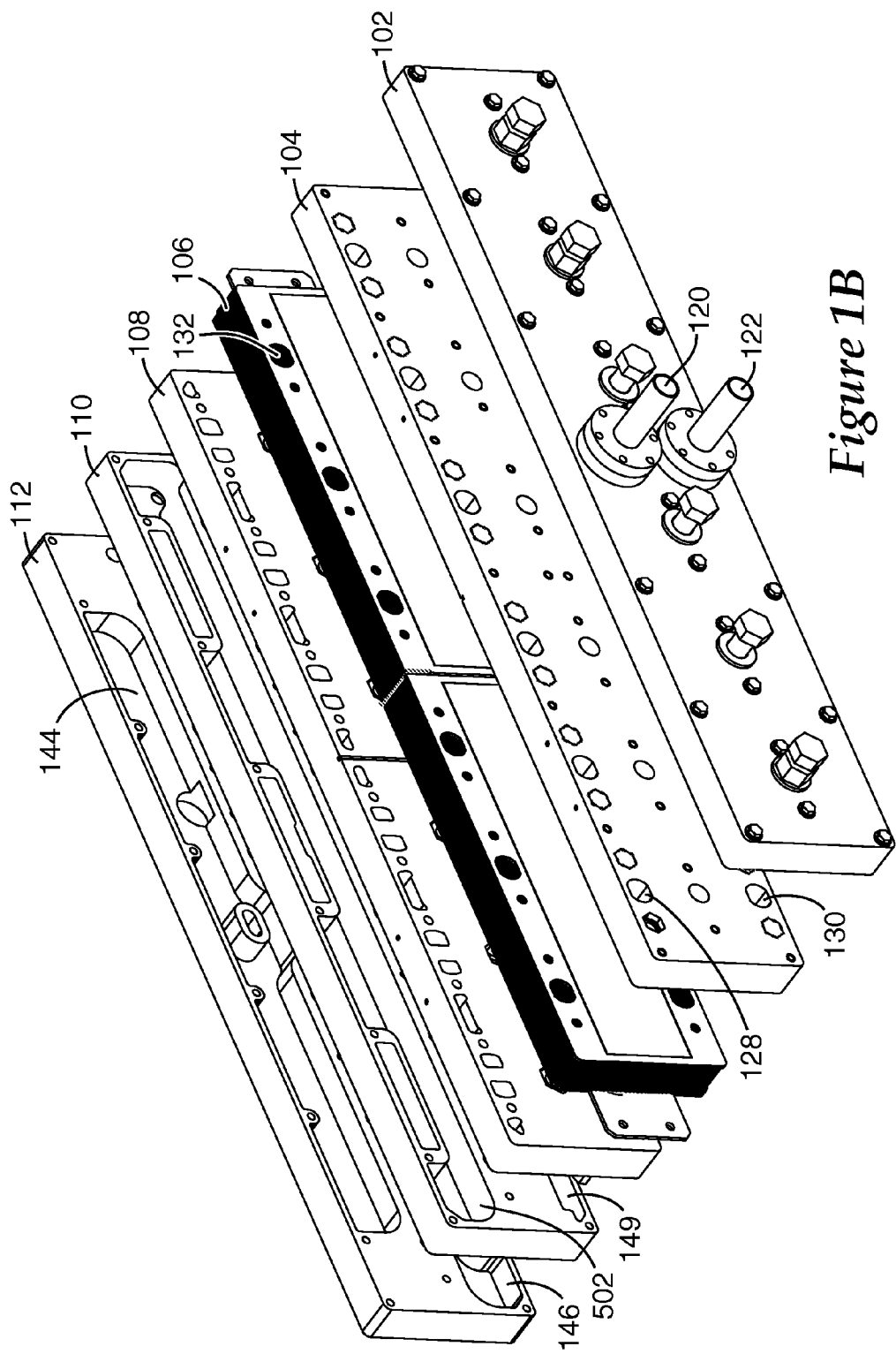
FIG. 1B is a rear perspective view of the fuel system of FIG. 1A.

Turning now to FIGS. 1A and 1B, exploded, perspective views of a fuel cell system 100 according to an embodiment of the invention are shown. The fuel cell system 100 is illustrated in these figures in a deployed orientation relative to gravitational fields, as represented by gravity vector 101. Some aspects of the illustrated design may be dependent on the orientation of the system 100 relative to gravity 101 (e.g., drainage of fluids), although many aspects may be applicable in alternate orientations.

As seen in FIG. 1A, the fuel cell system includes a coolant manifold 102, a first compression plate 104, a fuel cell stack assembly 106, a second compression plate 108, an anode gas (e.g., hydrogen) manifold 110, and a cathode gas (e.g., air) manifold 112. The cathode gas manifold 112 is stacked upon the anode gas manifold 110 in the assembled system 100. Feed and return ports 136, 138 for the anode gases are disposed on the external surface of the cathode gas manifold 112, as are the feed and return ports 142, 140 for cathode gases. Note that the anode gas ports 136, 138 are arranged centrally on the manifold 112, whereas the cathode gas ports 140, 142 are arranged to the side. The symmetric placement of the anode gas ports 136, 138 allows for more equal distribution of the anode gases in this stack assembly 106. In some configurations, the cathodes may be less sensitive to unequal flow distributions, and thus the cathode gas ports 140, 142 are placed to the side. Features may also be included in the cathode gas flow path to compensate for this asymmetry of the ports 140, 142. However, in other configurations, the fuel stoichiometry and dilution may make the cathodes more sensitive to unequal flows. In such a configuration, the cathode gas ports 140, 142 may receive the symmetric placement currently shown for the anode gas ports 136, 138, and vice versa.

The anode gas ports 136, 138 are connected to the anode gas manifold 110 by way of the cathode gas manifold 112, therefore features are provided in the manifolds 110, 112 that allow flow of anode gases through the outer cathode gas manifold 112 and into the inner anode gas manifold 110. These features are discussed in greater detail in relation to FIGS. 3 and 4. The inlet gases reaching the anode gas manifold 110 from the anode gas feed port 136 are distributed through passageways 147 in the compression member 108, and then into passages 158 in the fuel cell stack assembly 106. The passages 158 are in fluid contact with flow fields formed by the separation plates in the stack assembly 106. Anode gases leave the flow fields by way of lower passages (not shown) in the stack assembly 106, where they are carried through passages 161 (see FIG. 6) in the compression plate 108 and into a plenum of the anode gas manifold 110, and eventually out to the anode gas exit port 138 via the sealed passageway through the cathode gas manifold 112.

The cathode gases take a similar path from the cathode inlet port 142, into the cathode gas manifold 112, through the anode gas manifold 110, compression plate 108, and finally stack assembly 106. One difference is that the incoming cathode gases are first distributed to a plurality of passageways 149 through the anode gas manifold 110. These passages 149 are coupled to passages 151 in the compression member 108. The stack assembly 106 contains passages 153 that receive the cathode gases from the passages 151 and distribute the gases to the cathode gas flow fields in the separation plates. Cathode gases exit the flow fields at passages 152 where they are carried through passages 150 in the compression member 108, and eventually into the cathode gas manifold 112 by way of the passages 148 in the anode gas manifold 110. Cathode gases exit the cathode gas manifold 112 at the exit port 140.

As will be apparent in light of the above description, the gas ports 136, 138, 140, 142 are placed on one side of the fuel cell system 100. This may provide advantages in some installations, particularly where it is desirable to minimize the length and complexity of gas lines routed to the system 100. The coolant side of the system is similarly arranged, with all inlets and outlets placed on one side of the assembly. Generally, the coolant manifold 102 includes ports 120 and 122 (see FIG. 1B) used to couple respective coolant return and feed lines to the manifold. The coolant may include any manner of gas and/or liquid material capable of transferring heat, including water and glycol/water mixtures. The incoming and outgoing coolant is distributed in chambers or plenums 124, 126 of the manifold 102. The edges of the plenums 124, 126 include seals 125, 127 that form a sealing surface against the adjoining surface of compression member 104.

The compression member 104 contains fluid passageways 128, 130 used to carry respective incoming and outgoing coolant to the stack assembly 106. As these passageways 128, 130 distribute/collect fluids from/to the plenums 126, 124, they may be referred to herein as manifold passages, even though they are not formed in the manifold 102 itself. The stack assembly 106 contains inlet coolant passages 132 (see FIG. 1B) that are formed in the bipolar plates of the stack assembly 106. These passages 132 are in fluid communication with the manifold passages 128 of the compression member 104. Flow field channels are formed between adjacent anode and cathode plates and are in fluid communication with the stack passages 132 in order to distribute the coolant between the plates. Lower coolant ports (not shown) collect the coolant from the flow field channels and send it back out the return path through manifold passages 130 and plenum 126.

In the illustrated system 100, coolant is routed through the stack assembly 106, compression plate 104, and coolant manifold 102. One advantage to this is that the coolant supply and return lines are connected on a single side of the system 100, the exterior portion of the coolant manifold 102. There may be additional benefits in having the coolant restricted to these components, and this is due in part to the design of the stack assembly 106.

As was described above, the stack assembly 106 contains more than one stack, two stacks in this particular embodiment. In reference now to FIG. 2A, a top view of the stack assembly 106 is shown, not necessarily to scale. The assembly 106 includes two stacks 202, 204 that are each composed of a plurality of plate assemblies that each include an MEA sandwiched between anode and cathode separator plates. The resulting stacks 202, 204 have a resulting polarity that is defined by the difference in electrical potential between ends of the stacks. For example, stack 202 is electrically coupled to positive collector 206 at one end, that end terminating in a cathode plate of the stack 202. Similarly, a negative collector 208 is electrically coupled to the end of stack 204 that terminates in an anode plate, which is negative. The anode plate at the end of stack 202 and cathode plate at the end of stack 204 are both coupled to a coupling plate 210.

The arrangement of stacks 202, 204 in the stack assembly 106 results in current flow in a U-shaped path, as indicated by arrow 212. It will be appreciated that the stacks 202, 204 will have substantially different potentials at all locations except at the coupling plate 210. Therefore, it may be preferable in some situations to dispose an electrical insulator 214 between the stacks 202, 204 and/or their respective collector plates 206, 208. Under the ideal situation, physical separation is provided by placement of the stacks 202, 204 which are held apart by the non-conductive compression plates (e.g., plates 104 and 108 if FIGS. 1A and 1B). However, the insulation 214 may still be desirable in some cases to prevent incidental short circuiting of the plates under unusual conditions (e.g., mechanical shock and vibration) or upon leakage of fluids into the stack area. In particular, the highlighted region 216 between collector plates 206, 208 is the point of highest electrical potential difference between stacks 202, 204, and therefore electrical insulation is particularly desirable in this area 216. Likewise, region 213 is a region of lowest electrical potential difference between stacks 202, 204 because of the coupling plate 210.

As was previously mentioned, the coolant does not flow through both ends of the stack assembly 106, but enters and exits through the same end. This is shown in FIG. 2B, which shows a side view of the assembly in FIG. 2A. As seen in this view, coolant enters the stack assembly 106 through the bottom of coupling plate 210 as indicated by arrows 217. The coolant flows upward through coolant flow fields in the stack bipolar plates, and exits through the top of the coupling plate 210 as indicated by arrows 215. By having the coolant only flow through the coupling plate 210, and not through the collectors 206, 208, there is no fluid directly connecting between the adjacent edges of the collector plates 206, 208 (see adjacent region 216 in FIG. 2A). This minimizes any shunting effects that might be caused by liquid flowing between two closely proximate conductors having a high difference of electrical potential, in this case the collectors 206, 208. Although the coolant is shown flowing from bottom-to-top, a top-to-bottom flow may also be possible. In some cases, the illustrated bottom-to-top flow allows entrained gases to escape from the coolant, and therefore may be more easily removed via the manifold 102

Because the anode and cathode flows are both primarily gaseous, there is minimal risk in these fluid transfer passages having a short fluid coupling path between the collectors 206, 208. The fluid path of the cathode gases (e.g., air) is indicated by arrows 218 and 220 in FIG. 2C, and the fluid flow for anode gases is shown by arrows 222 and 224 in FIG. 2D. Note that, in the illustrated embodiment, the cathode gases 218, 220 flow from bottom-to-top, whereas the anode gases 222, 224 flow from top-to-bottom. As will be described in further detail hereinbelow, this arrangement of gas flows provides some advantages in relation to draining condensed fluids from the stack assembly 106. However, the alternate cathode and/or anode gas flows may also be applicable to embodiments of the present invention.

Figure 2A:
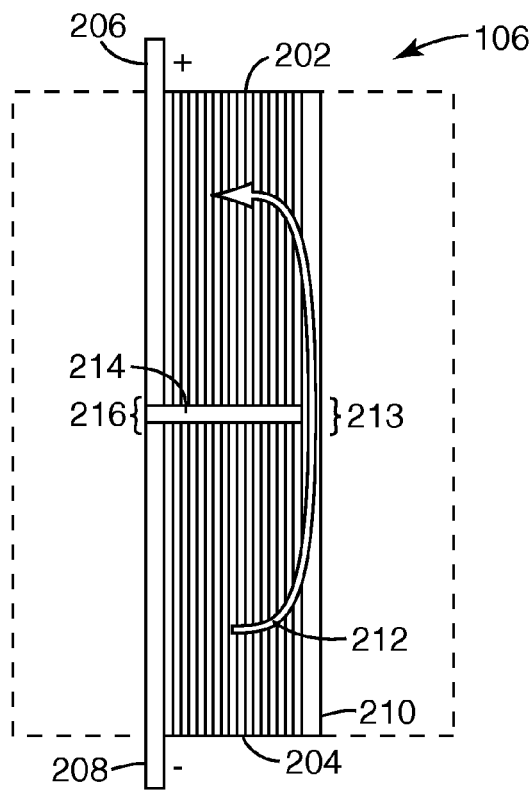
FIG. 2A is a top view of a fuel cell stack assembly showing current flow according to an embodiment of the invention.
Figure 2B:
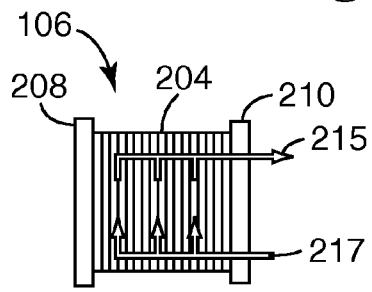
FIG. 2B is a side view of the stack assembly and showing a path of coolant flow through the stack assembly according to an embodiment of the invention.
Figure 2C:
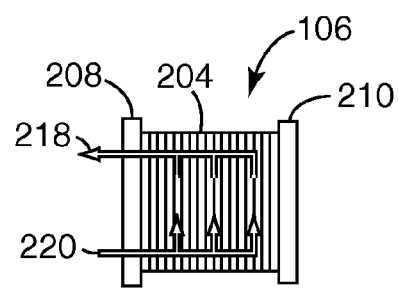
FIG. 2C is a side view of the stack assembly showing a path of cathode air flow through the stack assembly according to an embodiment of the invention.
Figure 2D:
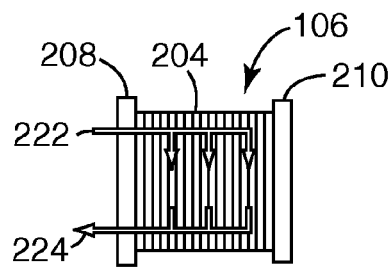
FIG. 2D is a side view of the stack assembly showing a path of anode gas flow through the stack assembly according to an embodiment of the invention.

As seen in FIG. 2A, the fuel cell stack assembly 106 includes two stacks 202, 204 that are arranged so that current flows in opposite directions in each stack 202, 204. The coupling of the stacks 202, 204 is provided by the coupling plate 210, so that current only flows in and out of the stack assembly 106 via the collector plates 206, 208, and no external wiring or other conventional electrical coupling means are needed outside of the stack assembly to couple the stacks 202, 204 to provide the desired voltage of the assembly 106.

Figure 2E:
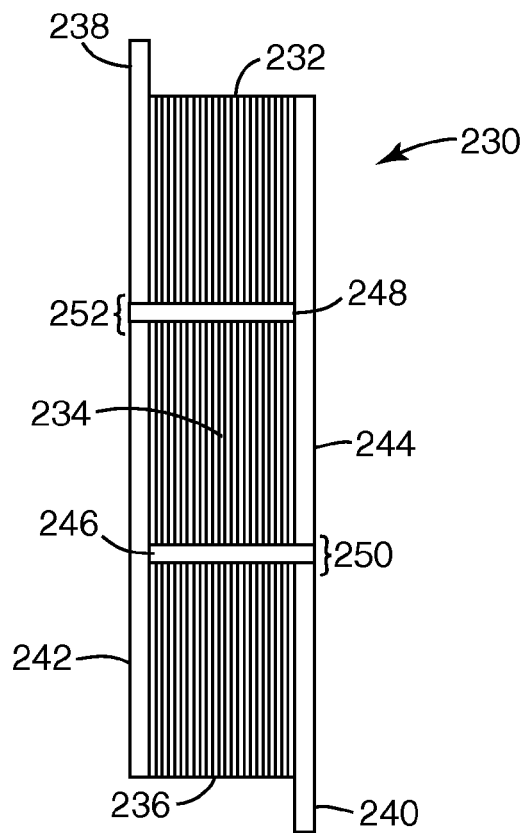
FIG. 2E is a top view of a stack assembly showing a three stack arrangement according to an embodiment of the invention.

However, this use of multiple stacks as described herein need not be limited to two stacks. For example, FIG. 2E shows an alternate stack assembly 230 that utilizes three stacks 232, 234, 236, wherein each stack 232, 234, 236 has a polarity (defined by direction of current flow from one end of the stack 232, 234, 236 to the other) opposite of the adjacent stack. Adjacent stacks 232 and 234 are coupled by coupling plate 244, and adjacent stacks 234 and 236 are coupled by coupling plate 242. Current collector 238 transfers current coming from or going to stack 232, and current collector 240 transfers current coming from or going to stack 236.

The stack assembly 230 may include two insulators 246 and 248, and have two points of high potential difference, indicated by areas 250 and 252. Note that, because the areas of closely spaced conductors in regions 250, 252 of electrical potential are on both sides of the stack 230, the advantage of having the coolant flow on just one side of the stack (see, e.g., FIG. 2B) is somewhat reduced. However, the value of the potential difference will generally be ⅔ of the total stack voltage instead of the full stack voltage, so the danger of shunting due to coolant flow is somewhat reduced. The electrical potentials in areas proximate to collector plate/coupling plate junctions is reduced further as the number of stacks in the assembly increase, because the potential difference at such points (at least in a linear arrangement of identical stacks as illustrated) will be 2V/n, where V is the total stack voltage and n is the number of individual stacks, where n is assumed to be greater than two.

Figure 2F:
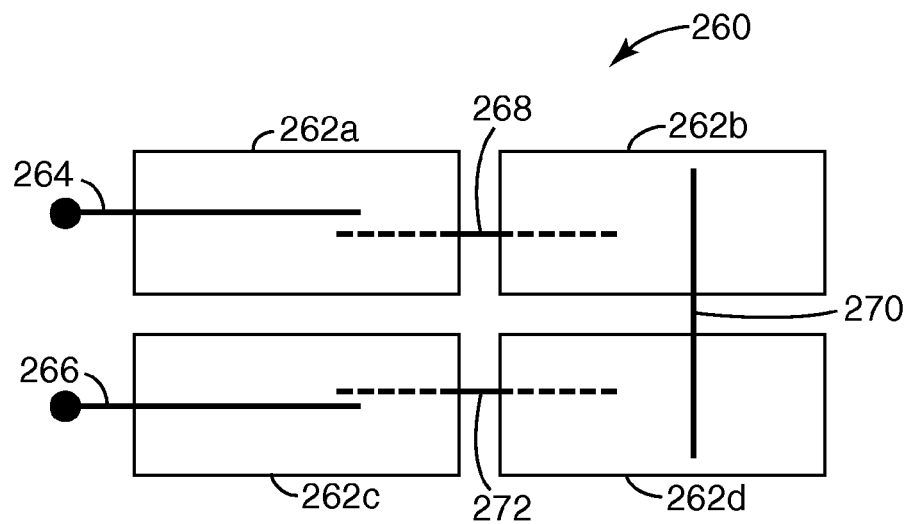
FIG. 2F is an end view of a stack assembly showing coupling of four stacks according to an embodiment of the invention.

The concepts incorporated in the stack assembly 230 of FIG. 2E may be extended to more than three stacks by adding stacks and coupling plates as appropriate. However, a stack assembly that uses three or more stacks need not be arranged linearly. An example stack assembly 260 that illustrates this is shown in FIG. 2F, which is an end view of assembly 260. The assembly 260 includes four fuel cell stacks, 262*a-d*, that are oriented so that current flow is perpendicular to the page. Lines 264, 266 represent current paths provided by collector plates, and lines 268, 270, 272 represent current paths provided by coupling plates. Note that the dashed portions of lines 268 and 272 indicate that they are disposed on the far side of the stacks 262*a-d*. It will be appreciated that other arrangements of collector and coupler plates may be possible in such an assembly 260 depending on system layout requirements. For example, coupling path 270 could diagonally span stacks 262*a* and 262*d*, thereby placing current collector 264 on stack 262*b*.

Figure 3:
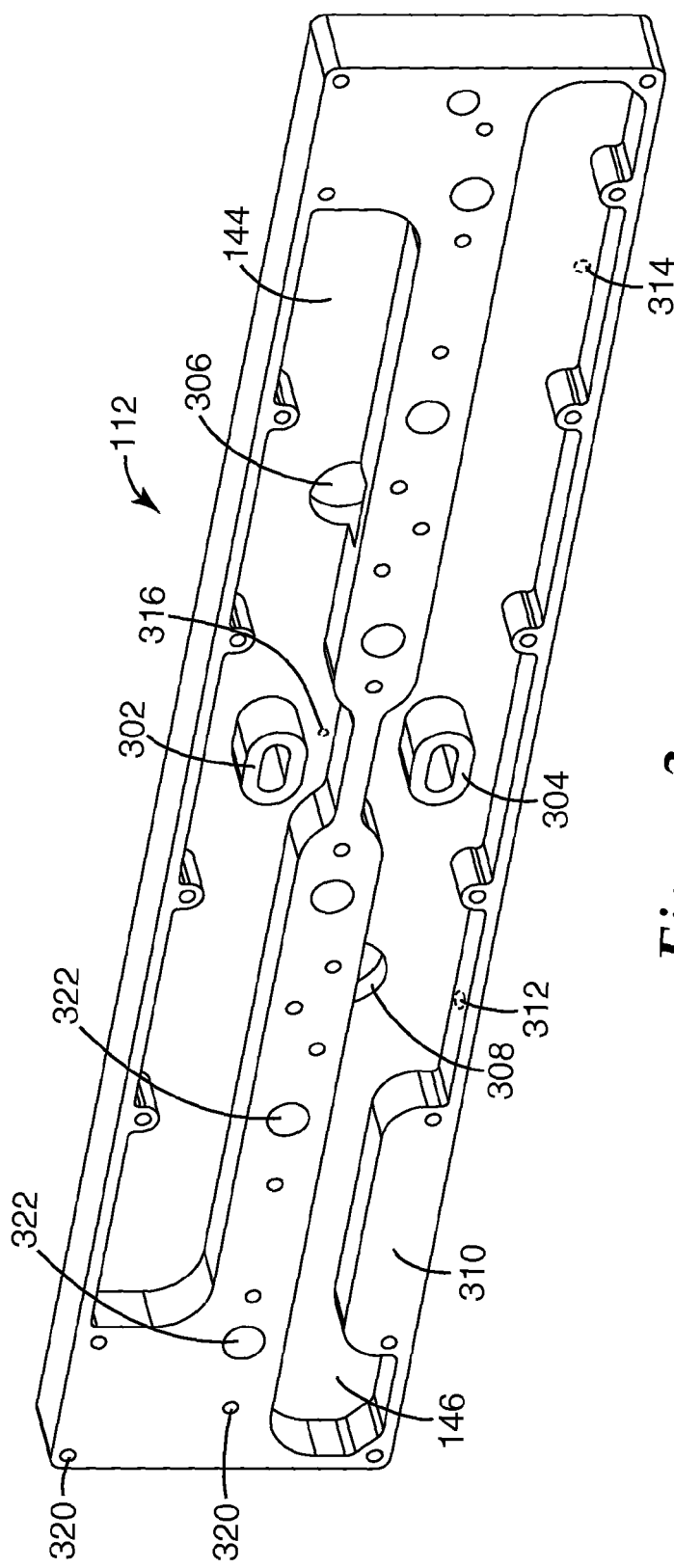
FIG. 3 is a rear, perspective view of a cathode air manifold according to an embodiment of the invention.
Figure 4:
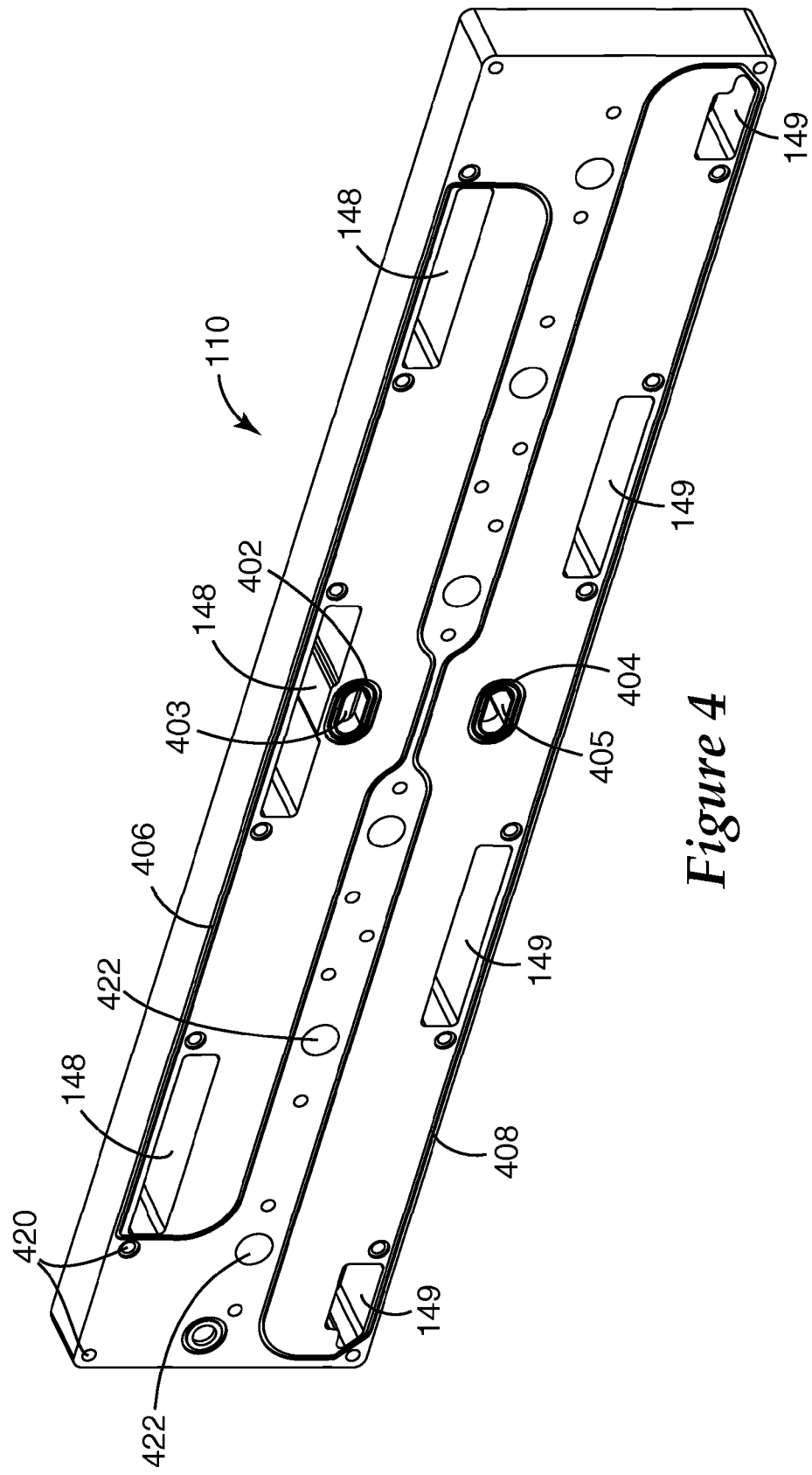
FIG. 4 is a front, perspective view of an anode gas manifold according to an embodiment of the invention.

As described above in relation to FIG. 1A, the anode gas ports 136, 138 are connected to the anode gas manifold 110 by way of the cathode gas manifold 112, therefore features are provided in the manifolds 110, 112 that allow flow of anode gases through the outer manifold 112. Similarly, features are included in the anode gas manifold 110 that allow cathode gases to flow through this manifold 110 from the cathode gas manifold 112. Additional details of these and other features, are described in relation to FIGS. 3-5. FIG. 3 is a perspective view of the internal part of a cathode gas manifold 112 according to an embodiment of the invention. The manifold 112 includes pass-through conduits 302 and 304 that are fluid coupled to the anode gas feed and return ports 136, 138 (see FIG. 1A). The walls of the conduits 302, 304 keep the anode and cathode gases separate, and the ends of the conduits 302, 304 opposite the ports mate with features of the anode gas manifold that will be discussed in further detail below.

This view of the cathode gas manifold 112 also shows the configuration of the input and output plenums 146, 144 (also seen in FIG. 1B). Voids 306, 308 provide fluid coupling between the plenums 144, 146 and ports 140, 142 respectively (see FIG. 1A). The input plenum 146 includes a restriction 310 that reduces flow to the side of the plenum nearest the void 308, thereby balancing flow between the left and right sides of the manifold 112. Also seen in this view are mounting holes 320 that receive hardware for connecting the cathode gas manifold 112 and the anode gas manifold 110 and pressure plate 108. Holes 322 are provided to optionally receive screws to push on the current collector for additional middle-of-the-stack compression and/or to extract current from the current collectors.

The gases moving through the manifold plenums 144, 146 may include water vapor. As such, there may be conditions where some of the moisture condenses and collects in the gas flow paths. Because the plenums 144, 146 may have low points in their respective return and feed paths, drain features may be included in the manifold 112. As indicated by broken lines, locations 312 and 314 may be used to place drain ports in the supply plenum 146, and location 316 may be used to place a drain support for the return plenum 144.

As discussed above, the conduits 302, 304 provide a passageway to couple anode gases from the external ports 136, 138 to the anode gas manifold 110. In reference now to FIG. 4, a perspective view of the anode gas manifold 110 shows some of the coupling and sealing features according to an embodiment of the invention. The front surface of the anode gas manifold 110 interfaces with the surface of the cathode gas manifold 112 (as seen in FIG. 3). In particular, seals 402, 404 interface with the conduits 302, 304 of the cathode gas manifold 112, and conduits 403 and 405 provide fluid coupling between the conduits 302, 304 and the inside of the manifold 110.

The manifold 110 also includes passages 148, 149 that allow cathode gases to flow between the cathode manifold 112 and manifold passages 150, 151 of the compression member 108, where they are eventually coupled to distribution passages 152, 153 of the stack assembly 106 (see FIG. 1A). The passages 152, 153 are in fluid connection with cathode gas flow fields of the separation plates of the stack assembly 106. Surrounding these passages 148, 149 are seals 406, 408 that seal off the plenums 144, 146 of the cathode gas manifold 112. Also shown in this view are holes 420, 422 that align with holes 320, 322 of the cathode gas manifold 112 seen in FIG. 3.

Figure 5:
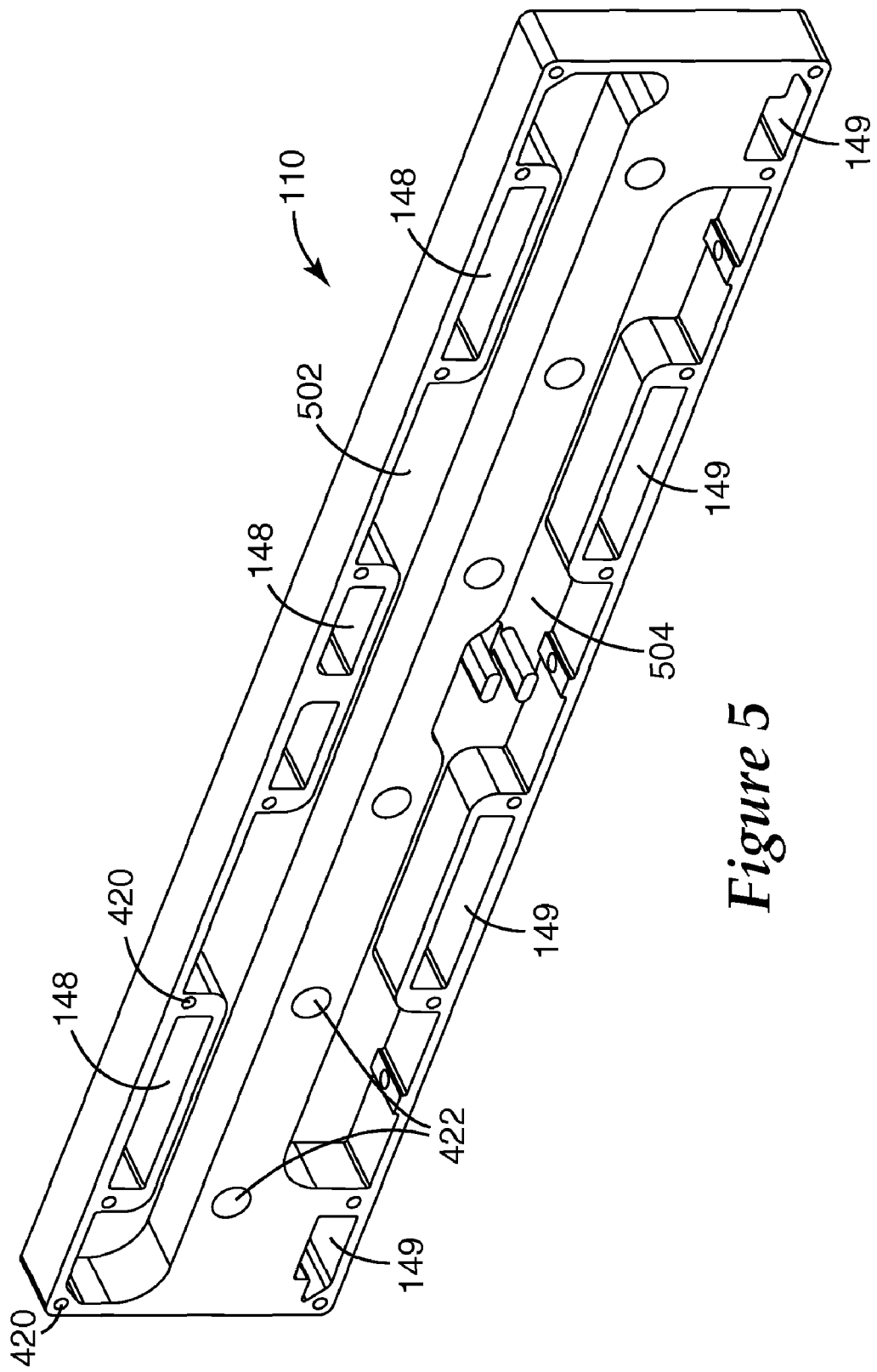
FIG. 5 is a rear, perspective view of an anode gas manifold according to an embodiment of the invention.

The other side of the anode gas manifold 110 is shown in the perspective view of FIG. 5. This view shows anode gas supply and return plenums 502, 504 that are in fluid communication with the conduits 403, 405. The plenums 502, 504 distribute the anode gas to manifold passages 147, 161 in the compression member 108, which then routes the anode gas to passages 155, 158 in the stack assembly 106 for distribution to the anode flow fields (see FIG. 1A and FIG. 6 for passage 161).

Figure 6:
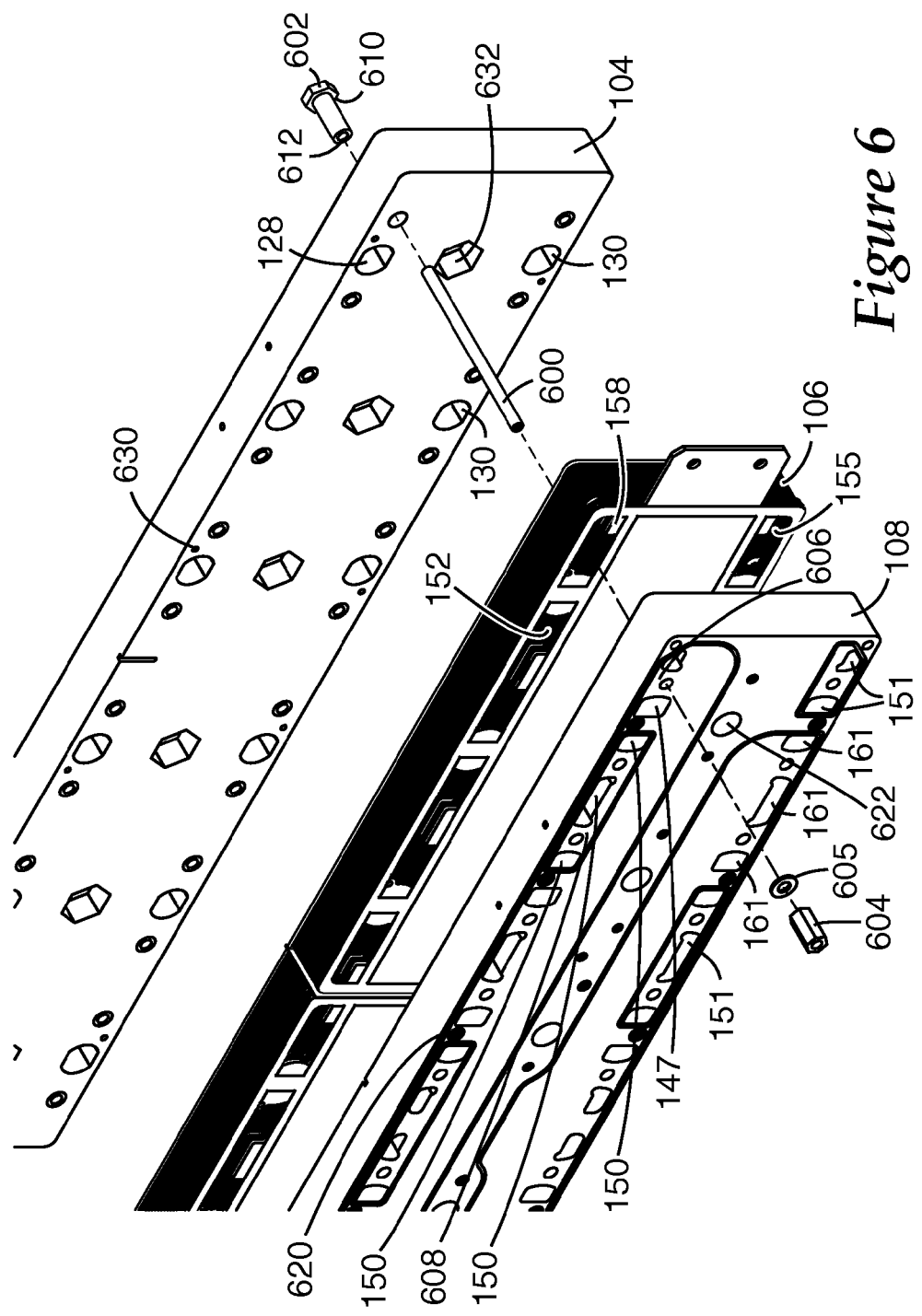
FIG. 6 is a front perspective view of a stack assembly and compression plates according to an embodiment of the invention.

Turning now to FIG. 6, various features of the compression plates 104, 108 and fuel cell stack assembly are illustrated according to an embodiment of the invention. The perspective view of FIG. 6 shows the interface between the compression members 104, 108 and the stack assembly 106. The compression members 104, 108 are typically flat plates that provide clamping forces on the stack assembly 106 after assembly. The compression plates 104, 108 also include features that facilitate flow of fluids to the stack assembly, such as the cooling passages 128, 130 on compression plate 104, anode gas passages 151, and cathode gas passages 150.

The compression plates 104, 108, are typically designed to be electrically isolated from the stack assembly 106, and therefore may be formed from a material that is not electrically conductive. For example, the plates 104, 108 could be machined from a polymer resin or similar material, which also reduces weight and machining costs. In other embodiments, the compression members 104, 108 could be formed from metal and/or other conductive materials, and an electrical insulator placed between the plates 104, 108 and the stack assembly 106. The compression plates 104, 108 are clamped around the stack 106, thus sealing off the gas flow passages to prevent leakage. In many stack/compression plate systems, these clamping forces are provided by hardware such as bolts or tie rods that pass through both the stack and compression plates. To accommodate this hardware, the stack and compression plates may include dedicated holes/voids for passing the compression hardware. One disadvantage to this, however, is that each of these voids provided for the compression hardware must include their own seals. These seals are needed to prevent leakage from gas and cooling manifolds into the hardware voids, which could result in these gases and/or fluids leaking from the fuel cell stack assembly. These seals may also help ensure there are no cross manifold leakages, particularly between the anode and cathode gas sections.

Systems that have dedicated voids through which to pass compression hardware must increase the size of the fuel cell stack assembly to accommodate the compression hardware, additional space to account for manufacturing tolerances, and the area needed to place a seal. For example, assume a stack design used 0.375 in. (0.953 cm) diameter compression hardware members (e.g., tie rods), that each take up 0.110 sq. in. (0.710 sq cm) of cross sectional space. The hole used to accommodate the hardware would have a 0.406 in. (1.03 cm) diameter, and would require an additional 0.25 in. (0.64 cm) of sealing surface, thus making the space consumed 0.906 in. (2.30 cm) diameter, or 0.645 sq. in (4.16 sq cm). In any design that uses compression hardware that goes through the stack, the 0.110 sq. in. (0.710 sq cm) of space consumed by the compression hardware must be accommodated for, so the additional space needed to accommodate seals for dedicated hardware voids is 0.645−0.110=0.545 sq. in (3.52 sq cm). If the design used 10 compression hardware members, then the total cross sectional area increase for the stack is 5.45 sq. in (35.2 sq cm).

The use of dedicated compression hardware void also impacts the total volumetric dimension of the system as well. For example, if it was assumed that the compression plates and fuel cell stack assembly were 15 inches (38 cm) thick/high, then the total volume needed to accommodate such a design is 5.45 sq. in.*15 in=80.3 cubic inches (1316 cubic cm). It will also be appreciated that with this increased volume comes increased weight, both because of the weight of gaskets, and the weight associated with increase peripheral sealing areas needed for the hardware voids.

Both volume and weight are at a premium in fuel cells that are designed for mobile environments. Therefore, to economize on this space consumed by dedicated compression hardware voids, the compression plates 104, 108, and stack assembly 106 shown in FIG. 6 deploy the compression hardware (e.g., tie rod 600) through the manifold passageways, e.g., anode gas passageways 147, 158, 161 and/or cathode gas passageways 150, 151, 152, 155. Although the size of the fluid passageways must be increased to account for the space taken up by the hardware 600, the total volume of the assembly is minimized by not requiring seals for dedicated hardware voids.

As shown in FIG. 6, tie rod 600 is mechanically coupled to compression plate 104 by way of insert 602, and coupled to compression plate 108 by way of nut 604 and washer 605. The insert 602 includes a threaded hole 612 that is closed at the far end, thereby sealing the threaded hole 612 from the coolant manifold. The tie rods 600 can be run through one or both of the anode gas passageways 147, 158 and cathode gas passageways 150, 152. In some arrangements, other sealed fluid or gas passages (e.g., coolant passages 128, 132, seen in FIG. 1B) may be used instead of or in addition to the illustrated anode and cathode gas passages 147, 158, 150, 152.

Special design considerations may be required when deploying compression hardware 600, 602, 604 inside fluid or gas passageways. For example, the compression plate may require attachment surfaces 606, 608 may be provided in the gas passages 147, 150 of the compression plate 108 in order to transfer compressive forces from the nut 604 and tie rod 600 to the rest of the compression plate 608. The inclusion of these attachment surfaces 606, 608 may require enlarging the respective passageways 147, 150 to compensate for the lost cross-sectional fluid flow area.

Another factor to consider when using the gas passageways as hardware throughways is that the compression hardware 600, 602, 604 must not allow the fluids or gases to escape. For example, this may involve using a fluid seal at hardware attachment points that might leak gas outside the respective flow transfer paths. For example, the illustrated inserts 602 may be exposed to air or fluid on the back side of compression plate 104, and therefore may include an o-ring or other compliant seal on the surface 610 that contacts the compression plate 104. In the illustrated example, however, the nuts 604 do not require sealing, because this end of the tie rod 600 is encompassed within the anode gas flow area that includes the voids 147, 158, and anode gas plenum 502 (see FIG. 5).

One factor to take into account, particularly when deploying metal hardware within the anode gas passageway 147, 158, is to guard against hydrogen embrittlement or corrosive effects that may occur to metals that are exposed to hydrogen gas in the anode gas passageways 147, 158. One way to overcome these effects is to use a material such as titanium or corrosion-resistant steel that is resistant to corrosive effects of hydrogen at the temperatures, pressures, and fastener tensile stresses seen in a PEM-type fuel cell. In other configurations, the hardware 600, 602, 604, 605 may be coated or sealed (e.g., using a heat shrinkable material) for protection against the effects of hydrogen gas exposure. Additionally, it may be possible to use other fluid passageways instead of the anode gas passageways 147, 158, such as the cathode passageways 152, 153 or coolant passages 132.

It will be appreciated that the nuts and inserts 604, 602 that retain the compression hardware 600 in the illustrated arrangement are not accessible from the exterior of the fuel cell system 100, because the cooling manifold 102 and anode gas manifold 108 prevent immediate access to this hardware. This arrangement has some advantages, because it prevents inadvertent gas leaks that might be caused by somebody unknowingly loosening the compression hardware from the outside of the fuel cell 100 and thereby causing a gas or fluid leak.

The compression member 108 includes mounting features 620, 622 (e.g., inserts) that receive hardware fastening the anode and cathode gas manifolds 110, 112. Features 620 receive hardware that is passed through holes 320, 420 of manifolds 112, 110. Similarly, compression member 104 includes features 630 (e.g., a threaded hole or an insert on the opposite side of member 104) for fastening the coolant manifold 102 to the compression member 104.

Figure 7:
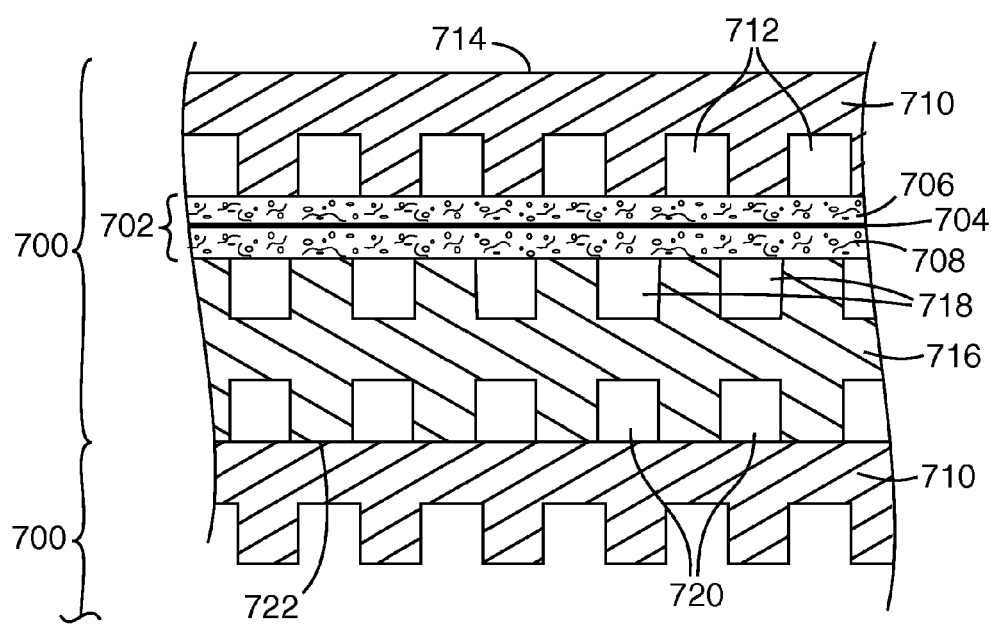
FIG. 7 is a cross-sectional view showing features of the plate assemblies used in the MEA stacks according to an embodiment of the invention.

As previously described regarding FIG. 2, two stacks 202, 204 are each composed of a plurality of plate assemblies. Each plate assembly includes an MEA sandwiched between anode and cathode separator plates, also referred to as bipolar plates. In reference now to FIG. 7, a cross sectional view illustrates features of the plate assemblies 700 used in the MEA stacks. Note that features of the plate assemblies 700 are not drawn to scale. The view of FIG. 7 is generally located somewhere in the center of the plate assembly, where flow fields contact an MEA 702 for delivering anode and cathode gases to the respective anode and cathode sides of the MEA 702.

The MEA 702 includes a PEM-type membrane 704 which is sandwiched between an anode gas diffusion layer (GDL) 706 and a cathode GDL 708, which are located on respective anode and cathode sides of the membrane 704. An anode plate 710 includes flow field features, seen here as channels 712, for evenly distributing hydrogen to the anode GDL 706. Besides distributing hydrogen, the anode plate 710 is electrically conductive, and removes electrons from the MEA 702 to either a current collector, adjacent plate assembly 700, or some other current carrying element (e.g., coupling plate or current shunt). The side 714 of the anode plate 710 facing away from the MEA 702 is flat/smooth. This can reduce manufacturing costs of the plate 710, because the plate 710 only needs flow field features 712 formed on the side of the plate 710 that faces the MEA 702.

Adjacent to the cathode GDL 708 is the cathode plate 716, which also includes flow field features 718 for distributing air to the cathode GDL 706. The cathode plate 716 is conductive and delivers electrons to the MEA 702. The opposite side 722 of the cathode plate 716 includes coolant flow field features 720 for carrying coolant between adjacent plate assemblies 700. The far side 722 of the cathode plate 716 is in physical and electrical contact with the anode plate 710 of an adjacent plate assembly 700. The exception to this is when the plate assembly 700 is at the end of the stack, then it may be coupled to a current collector or some other current carrying element.

The coolant flow field 720 delivers coolant that cools both the cathode plate 716 in which the flow field 720 is etched/machined, but also the anode plate 710 of the adjacent plate assembly 700. Because the cathode plate 716 includes features on both sides, the cathode plate 716 is typically thicker than the anode plate 714. One advantage of including the cooling flow fields 720 on the cathode plate 716 only is that the features on both sides of the cathode plate can be made the same depth. Therefore, in situations where the flow fields are formed via etching, this requires only a single precision etching operation to form the features on the entire plate 716. If other features such as manifold holes and voids are etched (e.g., instead of machining or stamping the holes) this may require additional etching steps. However creating holes by etching requires far less precision than is required to etch flow fields 718, 720, therefore cost savings can still be realized. As will be described in greater detail elsewhere herein, the anode plate 710 also can be formed with flow fields 712 of a single depth, and includes gas distribution features that allow the thickness of the anode plate 710 to remain near its theoretical minimum, given design considerations of strength and heat transfer.

Figure 8:
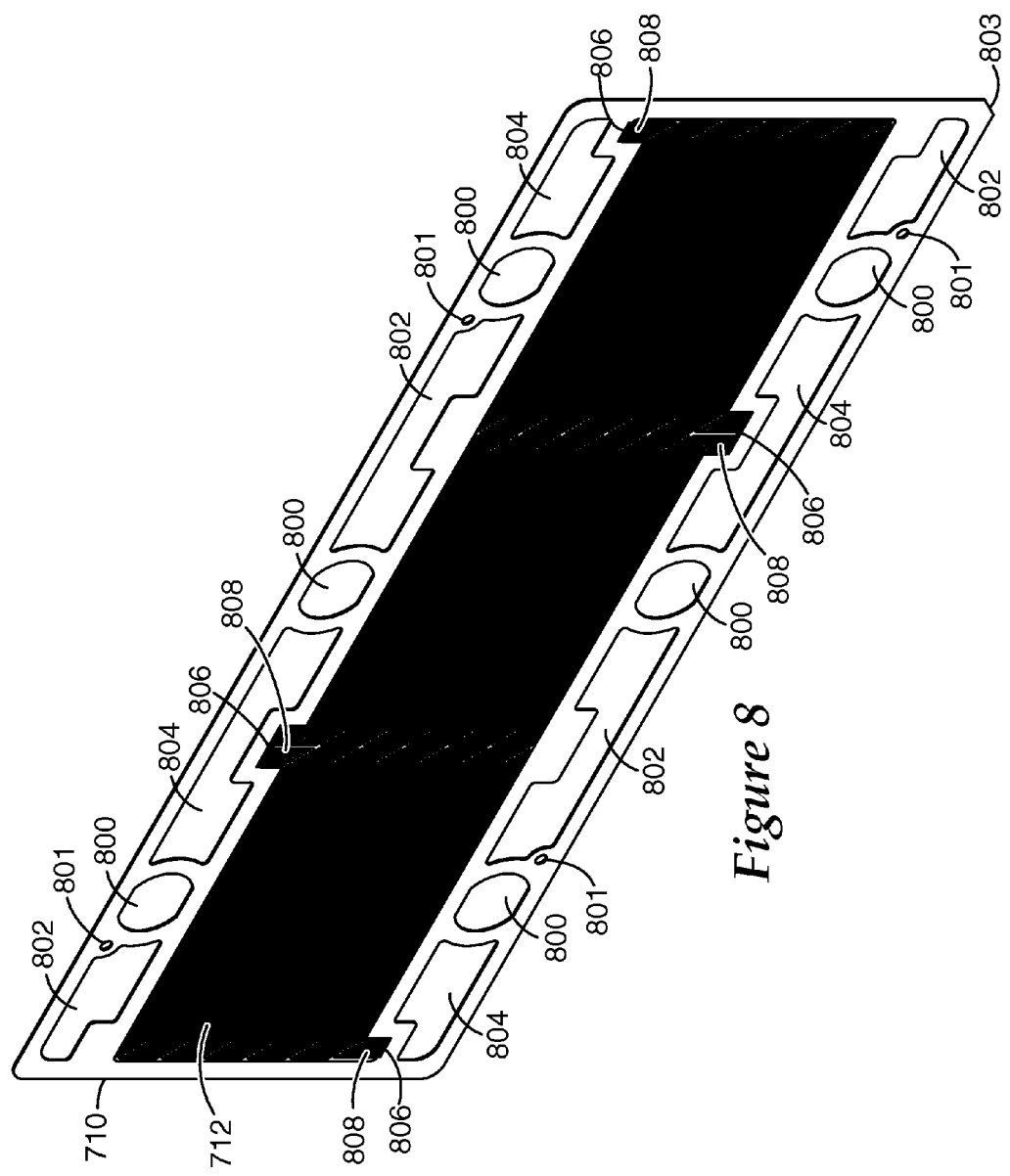
FIGS. 8-9 are perspective views showing an anode plate according to an embodiment of the invention.

In order to gain a better understanding of features of the anode and cathode plates 710, 716, FIGS. 8-11 show perspective views of example configurations of the plates 710, 716. In FIG. 8, a perspective view is shown of the MEA-facing side of an anode plate 710 according to an embodiment of the invention. The anode plate 710 may be formed from titanium alloys for maximum strength and corrosion resistance. Other plate materials may include nickel-chromium alloys that are coated with a thin solid layer of CrN or TiN to improve corrosion resistance. The flow fields 712 are finely formed grooves on the surface of the plate 710 that evenly distribute hydrogen over the surface of the anode GDLs. A series of coolant manifold holes 800 and cathode gas manifold holes 802 are provided in the plate 710 to facilitate flow of respective coolant and cathode gases in a direction perpendicular to the plate 710. Similar features in the cathode plates 716 and MEAs line up when stacked to form coolant and cathode gas passageways that are coupled to manifolds that carry the respective fluids through the stack (see FIGS. 1A and 1B).

The anode plate 710 also includes anode gas manifold holes 804 that facilitate distribution of hydrogen through all plates of the stack. In addition, the plate 710 includes features that allow distribution of hydrogen from the manifold holes 804 to the flow field 712, while still allowing for sealing between the plate 710 and an MEA. Generally, this involves coupling the manifold holes 804 to the flow field 712 via a path that causes the gas to contact both sides of the plate 710. That flow path includes distribution voids 806 disposed between the flow fields 712 and the manifold holes 804. The voids 806 are coupled to the flow fields 712 via channels 808 and allow hydrogen to pass therebetween. Note that the flow field channels 808 do not pass directly to the manifold holes 804. Further, as will be described in greater detail below, there are no channels on either side of plate 710 that couple the distribution voids 806 to the manifold holes 804.

By terminating the channels 808 at the distribution voids 806, the area immediately surrounding the perimeter of the anode gas manifold holes 804 can remain free of flow channels to facilitate a tighter perimeter seal. This also allows for the anode gas manifold holes 804 to retain a consistent sealing surface on the other side, as will be seen further hereinbelow. Alternatively, the area surrounding the gas manifold holes 804 (and other manifold holes in the plates) may include features (e.g., a 10 mil (0.25 mm) channel) for containing a gasket that seals the holes 804 from the MEA while allowing the coolant sides of the plates 710, 716 to contact each other in the assembly and the other sides of the plates 710, 716 to contact the MEA.

Also seen in FIG. 8 are alignment holes 801 and corner chamfer 803 that help prevent misalignment and misorientation of the plate 710. These features align with related features of the cathode plate (in particular holes 1001 and chamfer 1003 in cathode plate 716 of FIG. 10) in the assembled stack. Generally alignment holes 801, 1001 fit over an alignment pin (not shown) that runs from first to second end of the stack. Even if it was possible to put a plate in a mirror image orientation (e.g., in a configuration where holes 801, 1001 are symmetrically disposed) misoriented plates 710, 716 will be apparent by viewing the corner of the stack having the chamfered corner formed by features 803, 1003.

Figure 9:
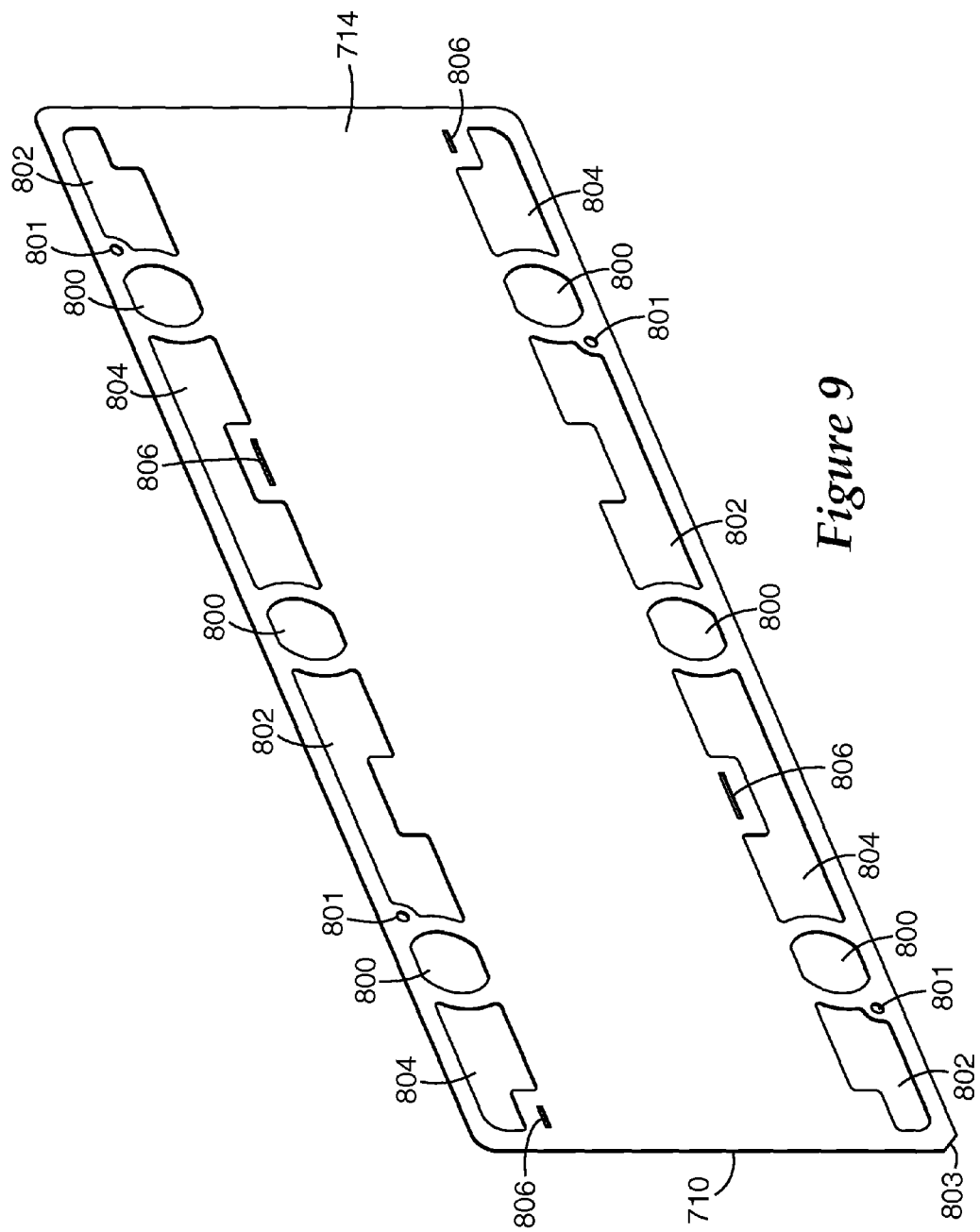

In reference now to FIG. 9, a perspective view of the back side 714 of plate 710 is shown. This side 714 faces away from the MEA and generally interfaces with a cathode plate 716 of a neighboring plate assembly. As previously mentioned, this side 714 is substantially smooth. Note that the distribution voids 806 are not coupled to etched channels on this side 714 of the plate 710. As with the rest of the plate, the area between the distribution voids 806 and manifold holes 804 is substantially devoid of flow channels to allow for sealing of the manifold holes 804 on this side 714 of the plate 710. Instead, features of the adjoining cathode plate 716 facilitate flow between the distribution voids 806 and the anode gas manifold holes 804.

Figure 10:
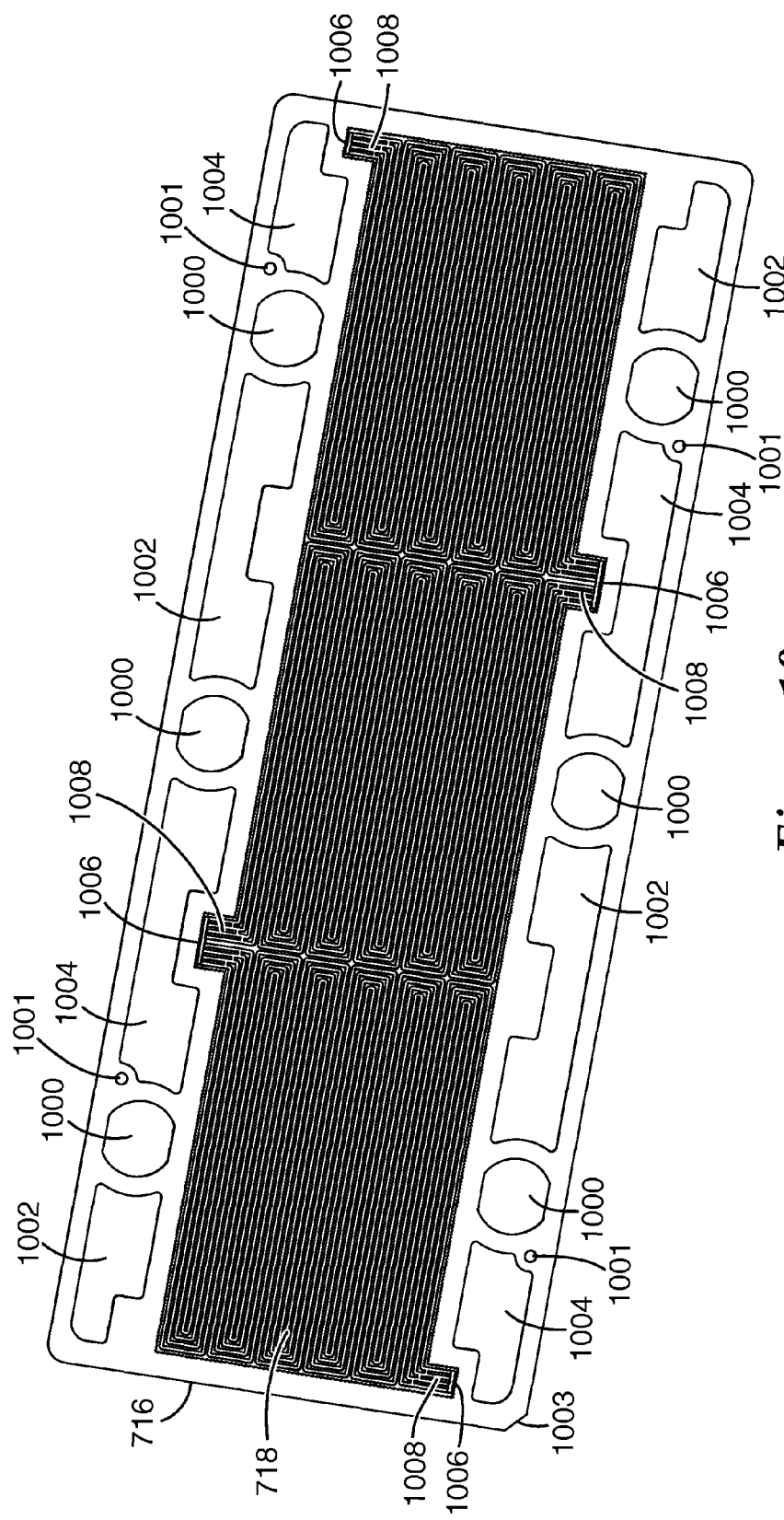
FIGS. 10-11 are perspective views showing a cathode plate according to an embodiment of the invention.

Turning now to FIG. 10, a perspective view of a cathode plate 716 is shown according to an embodiment of the invention. The cathode plate 716 may be formed from titanium alloys for maximum strength and corrosion resistance. The cathode plate 716 may also be formed from nickel-chromium alloys that are coated with a thin solid layer of CrN or TiN to improve corrosion resistance. The side of the plate 716 visible in this view includes the cathode gas flow field 718 that is formed onto the surface of the plate 716. The cathode gas flow field 718 evenly distributes air over the surface of the cathode GDLs. As with the anode plate 710, the cathode plate includes a series of coolant manifold holes 1000, anode gas manifold holes 1002, and cathode gas manifold holes 1004 to facilitate flow of coolant and gases in a direction perpendicular to the plate 716. Similarly, distribution voids 1006 are coupled to the flow fields 718 via channels 1008, forming part of a flow path that allows air to pass between the fields 718 and the air manifold holes 1004, as will be seen in FIG. 11.

Figure 11:
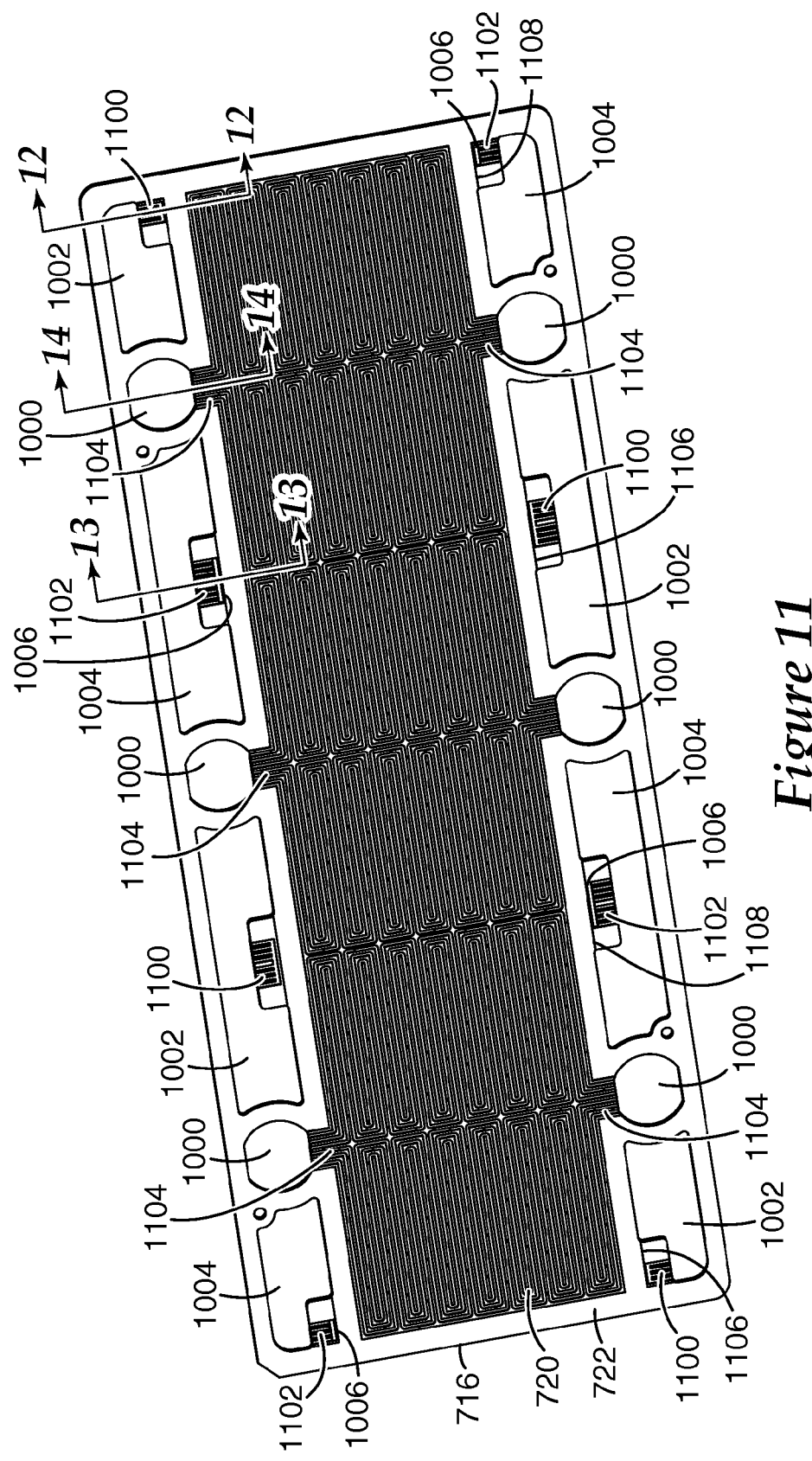

In FIG. 11, a perspective view of the side 722 of the cathode plate 716 facing away from the MEA is shown according to an embodiment of the invention. This side 722 interfaces with the smooth side 714 of the anode plate of an adjacent plate assembly (see FIG. 9). This side 722 of the plate includes channels 1100 and 1102 that couple the distribution voids 806 and 1006 to the respective anode gas manifold holes 1002 and cathode gas manifold holes 1004. These channels 1100, 1102 complete the path from the manifolds holes 1002, 1004 to the flow fields 712, 718 seen in the views of FIGS. 8 and 10.

Also visible in this view are the coolant flow fields 720 and channels 1104 that directly couple the flow fields 720 to the coolant manifold holes 1000. The coolant manifold holes 1000 on this side 722 of the cathode plate 716 are sealed by one or more gaskets seal around the gas manifold holes 1002, 1004 and the around the coolant manifold holes 1000 and flow field 720 together. Note that channels 1100, 1102 are formed on slightly thicker material, as represented by steps 1106 and 1108. In this way channels 1100, 1102 can interface tightly against the adjacent anode plate while allowing space for coolant flow/manifold seals and gas manifold seals on this side 722.

Figure 12:
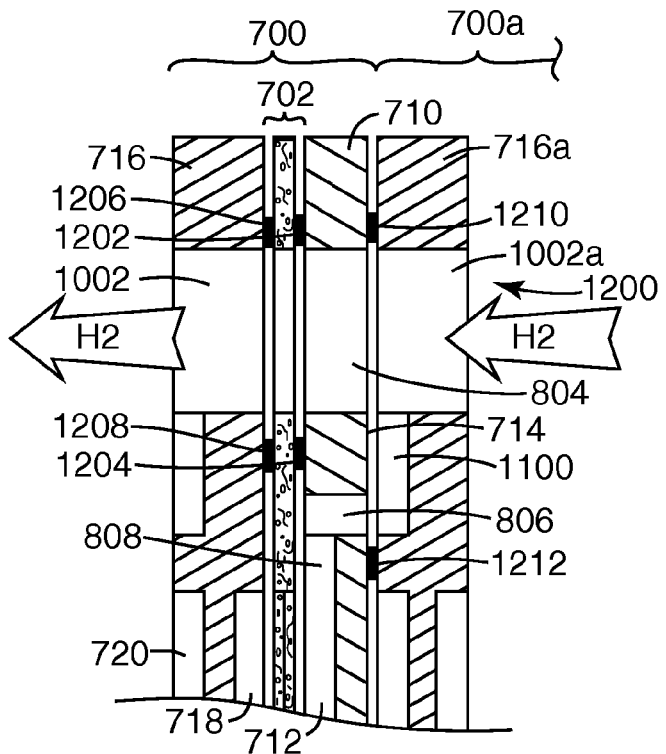
FIG. 12 is a cross-sectional view of a plate assembly corresponding to section 12-12 of FIG. 11.
Figure 13:
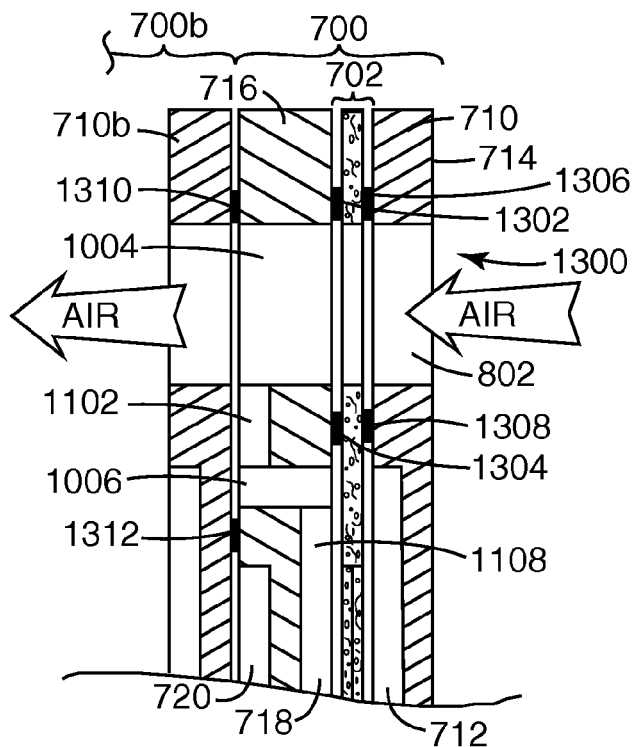
FIG. 13 is a cross-sectional view of a plate assembly corresponding to section 13-13 of FIG. 11.
Figure 14:
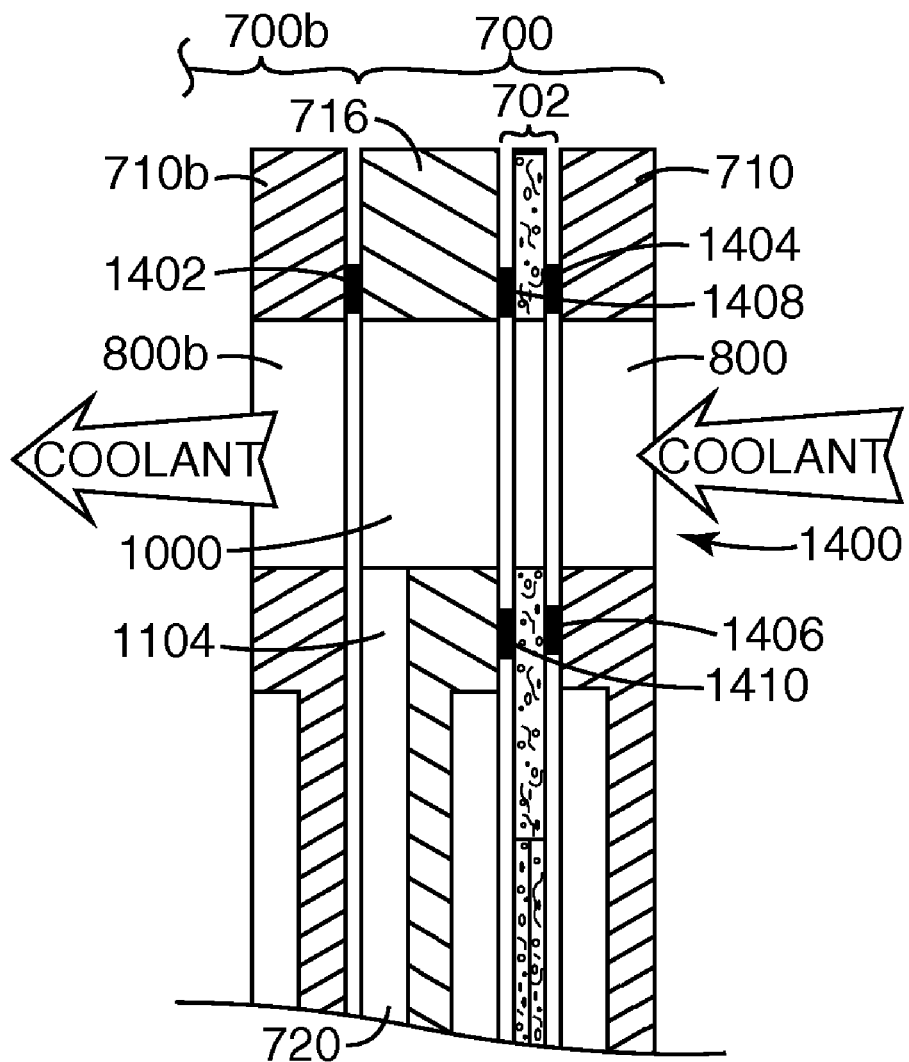
FIG. 14 is a cross-sectional view of a plate assembly corresponding to section 14-14 of FIG. 11.

In order to better illustrate the flow of the gases and coolant between and into the plates, FIG. 12 shows a cross section of a plate assembly 700 corresponding to section 12-12 of the cathode plate 716 in FIG. 11 (note that the sections illustrated in FIGS. 12-14 are not drawn to scale). Cathode plate 716, MEA 702, and anode plate 710 are coupled together to form a plate assembly 700. Cathode plate 716a is from an adjacent plate assembly 700a, which is only partially illustrated. When the plates 716, 710, 716a, and MEA 702 are stacked together, the manifold holes 1002, 1002a, 804 form an anode gas passageway 1200. This passageway 1200 is part of the anode gas distribution that includes manifolds for supplying and removing hydrogen from the anode flow fields 712 of the anode plate 710. Note that the gaps between plates 716, 710, 716a are merely illustrative, and the plates 716, 710, 716a may directly touch depending on the gasketing used and the arrangement of plates involved. For example, anode and cathode plates 710, 716 do not touch each other on the sides facing the MEA, but do touch each other on the coolant side if they are electrically conducting in potential contact regions.

The anode flow field 712 contacts the distribution void 806, which creates a flow connection from the first side of the plate 710 (e.g., the side facing the MEA 702) and the second side 714 of the plate 710 (e.g., the side facing away from the MEA 702, and facing the cathode plate 716a of an adjacent plate assembly 700a). Recall that from FIG. 9, the second side 714 of the anode plate 710 is smooth, therefore the channels 1100 of the adjacent cathode plate 716a provides a fluid path between the void 806 and the anode gas passageway 1200. In this way, the anode plate 710 can be manufactured with uniform depth features (e.g., flow field 712, channels 808) on one side, and leave the other side 714 featureless. This also takes advantage of the fact that the cathode plates 716, 716a already require the coolant flow fields 720 to be formed onto the side of the plates 716, 716a facing the smooth side 714 of the anode plate 710, therefore there is little or no added expense in placing the channels 1100 on the cathode plates 716 instead.

Another advantage of using the illustrated arrangement relates to sealing between the plates 710, 716, and the MEA 702. Regarding the anode gas flow, the use of the void 806 and channels 1100, 808 allows a tight seal between adjacent members of the stack, represented by blocks 1206, 1208 representing seals created between the cathode plate 716 and the MEA 702. These sealing areas 1206, 1208 are made tight to prevent anode gases from leaking into the cathode flow fields 718. These blocks 1206, 1208 may represent a compliant sealing member, or may just indicate areas that allow smooth surface-to-surface interfaces (e.g., no machined flow channels) around the passage 1200. Similar sealing features 1202, 1204 are shown between the anode plate 710 and MEA 702, although preventing leakage here may not be as critical. Also features 1210, 1212 indicated sealing between the anode plate 710 and adjacent cathode plate 716a, which prevent leakage between anode gas and coolant flows.

Similar features in the cathode plates 716 provide of sealing around the cathode gas passages 1300 formed by manifold holes 1004, 802, as is shown in FIG. 13. FIG. 13 shows a cross section of a stacked together plate assembly 700 corresponding to section 13-13 in FIG. 11. Because the cathode plate 716 in the example of FIG. 13 is sufficiently thick enough to support having flow features on both sides, the cathode gases can flow from the passageway 1300 to the channels 1102 on the side of the cathode plate 716 facing away from the MEA 702. The void 1006 connects the far side channels 1102 to the channels 1108 facing the MEA 702, where gases are then carried to/from the flow field 718.

The use of the void 1006 and channels 1102, 1108 allows a tight seal, represented by blocks 1306, 1308, to be created between the anode plate 710 and the MEA 702. These sealing areas 1306, 1308 need to be tight to prevent cathode gases from leaking into the anode flow fields 712. The blocks 1306, 1308 may represent a compliant sealing member, or may just indicate areas that allow smooth surface-to-surface interfaces (e.g., no machined flow channels) around the passage 1300. Other cathode passage sealing features 1302, 1304 are shown between the cathode plate 716 and MEA 702, as well as features 1310, 1312 between the cathode plate 716 and adjacent anode plate 710b that is part of adjacent plate assembly 700b.

In reference now to FIG. 14, a cross sectional view corresponding to section 14-14 in FIG. 11 illustrates the coupling between coolant passageway 1400 and the coolant flow fields 720. The coolant passageway 1400 is formed by coolant holes 1000, 800, 800b of plate assemblies 700, 700b. Coolant channels 1104 bring the coolant to flow field 720 where it is distributed between anode plate 710b and cathode plate 716 of adjacent plate assemblies 700b, 700. Note that the coolant channels 1104, 720 are both on the side of the cathode plate 716 facing away from the MEA 702. As such, there is only one sealing point 1402 adjacent the channel 1400. However, design features of the cathode plate 716 as seen in FIG. 11 allow a single seal to cover both the manifold holes 100 and flow channels 720, 1104. Other sealing portions 1404, 1406, 1408, 1410 seal the coolant from entering between the MEA and respective cathode and anode plates 716, 710.

It will be appreciated that the gas/fluid flow features shown in FIGS. 12-14 are equally applicable to both incoming and outgoing gases/fluids. Further, many variations of the illustrated configurations are possible in embodiments of the invention. For example, the anode plates 710 could contain channels on both sides, and the cathode plate 716 could be made thinner with features on just one side. In another example, the coolant channels 1104 that connect the coolant flow field 720 to the coolant passages 1300 may be formed using dual sided channels connected by a void, similar to the features on the anode and cathode gas flow paths. In yet another variation, the configuration of anode plates 710 and cathode plates 716 may be reversed, so that the anode plates 710 are thicker and include flow fields on both sides.

The foregoing description of the exemplary embodiments of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather determined by the claims appended hereto.

What is claimed is:

1. A fuel cell assembly comprising:
   first and second compression members;
   two or more membrane electrode assembly (MEA) stacks disposed between the compression members, each MEA stack having a positive and negative end;
   a first current collector electrically coupled to a positive end of a first stack of the MEA stacks;
   a second current collector electrically coupled to a negative end of a second stack of the MEA stacks; and
   a current shunt disposed between the compression members and electrically coupling the MEA stacks.

2. The fuel cell assembly of claim 1, further comprising coolant passages to facilitate the flow of coolant through the MEA stacks in a direction between the first and second compression members, and wherein the coolant passages are arranged so that a region of closest contact between the MEA stacks that is directly coupled by the coolant is a region of lowest electrical potential difference between the MEA stacks.

3. The fuel cell assembly of claim 1, wherein the MEA stacks are arranged side by side between the compression members so that each MEA stack has a polarity opposite of adjacent MEA stacks.

4. The fuel cell assembly of claim 1, wherein the MEA stacks further comprise passages that distribute anode and cathode gases through the MEA stacks in a path between the first and second compression members.

5. The fuel cell assembly of claim 4, further comprising tie-rods disposed within the MEA stacks, and wherein the first and second compression members and the MEA stacks are held together by the tie-rods.

6. The fuel cell assembly of claim 5, wherein the tie rods are placed within the passages that distribute the anode and cathode gases through the MEA stacks.

7. The fuel cell assembly of claim 6, wherein the tie rods are made of titanium.

8. The fuel cell assembly of claim 1, wherein the first and second current collectors are disposed between the first compression member and the respective first and second stacks of the MEA stacks.

9. The fuel cell assembly of claim 8, wherein the current shunt includes a coupling plate disposed proximate to the second compression member and electrically coupling adjacent ends of at least two of the MEA stacks, wherein one of the adjacent ends is a positive end and another of the adjacent ends is a negative end.

10. The fuel cell assembly of claim 8, wherein the second compression member comprises:
    coolant inlet passages that facilitate delivering of liquid coolant to the MEA stacks; and coolant outlet passages that facilitate removing of the liquid coolant from the MEA stacks.

11. The fuel cell assembly of claim 8, wherein the first compression member comprises:
   gas inlet passages that facilitate delivering of anode gases and cathode gases to the MEA stacks; and
   gas outlet passages that facilitate removing the anode gases and the cathode gases from the MEA stacks.

12. The fuel cell assembly of claim 8, wherein edges of the first and second current collectors are in close proximity.

13. The fuel cell assembly of claim 12, further comprising an electrical insulation member between the edges of the first and second current collector.

14. The fuel cell assembly of claim 12, wherein the MEA stacks further comprise coolant passages that carry coolant through the MEA stacks in a direction between the first and second compression members, and wherein the coolant passages are arranged to prevent fluid contact directly between the edges of the first and second current collectors.

15. The fuel cell assembly of claim 1, wherein the first current collector is disposed between the first compression member and a first stack of the MEA stacks, and the second current collector is disposed between the second compression member and a second stack of the MEA stacks.

16. The fuel cell assembly of claim 15, wherein the current shunt comprises:
   a first coupling plate disposed proximate to the first compression member;
   a second coupling plate proximate to the second compression member; and
   wherein each of the first and second coupling plates electrically couple adjacent ends of at least two of the MEA stacks, wherein one of the adjacent ends is a positive end and another of the adjacent ends is a negative end.

17. The fuel cell assembly of claim 1, wherein the first compression member comprises:
   gas inlet passages that facilitate delivering of anode gases and cathode gases to the MEA stacks; and
   gas outlet passages that facilitate removing of the anode gases and the cathode gases from the MEA stacks; and
wherein the second compression member comprises:
   coolant inlet passages that facilitate delivering of liquid coolant to the MEA stacks; and
   coolant outlet passages that facilitate removing of the liquid coolant from the MEA stacks.

18. The fuel cell assembly of claim 17, wherein the gas inlet and outlet passages and coolant inlet and outlet passages are perpendicular to a horizontal plane of the first and second compression members.

19. The fuel cell assembly of claim 17, further comprising:
   an anode gas manifold having anode gas chambers coupled to a first set of the gas inlet and outlet passages via the first compression member;
   a cathode gas manifold having cathode gas chambers coupled to a second set of the gas inlet and outlet passages via the first compression member; and
   wherein the anode gas chambers are in close proximity to the cathode gas chambers.

20. The fuel cell assembly of claim 19, wherein the anode gas chambers and cathode gas chambers include features to facilitate uniform distribution of the respective anode and cathode gases.

21. The fuel cell assembly of claim 1, wherein the MEA stacks each comprise a plurality of plate assemblies stacked together, each plate assembly comprising an anode plate, a cathode plate, and an MEA disposed between the anode and cathode plates, and wherein one of the anode and cathode plates is thinner than the other one.

22. The fuel cell assembly of claim 1, wherein the MEA stacks each comprise a plurality of plate assemblies stacked together, each plate assembly comprising an anode plate, a cathode plate, and an MEA disposed between the anode and cathode plates, and wherein at least one the anode and cathode plates have first flow field features of a first uniform depth on a side facing the MEA and second flow field features of a second uniform depth on a side facing away from the MEA.

23. The fuel cell assembly of claim 22, wherein the first and second uniform depths are substantially the same.

24. The fuel cell assembly of claim 1, further comprising one or more electrical insulation members between adjacent MEA stacks.

25. A fuel cell comprising:
   compression members arranged at first and second ends of the fuel cell;
   at least two membrane electrode assembly (MEA) stacks having electrically positive and negative ends, the MEA stacks arranged side by side between the compression members;
   a current shunt internal to the fuel cell, the current shunt electrically connecting the MEA stacks at the second end of the fuel cell;
   positive and negative electrical connections for the fuel cell, the positive and negative connections arranged at the first end of the fuel cell; and
   coolant passages to facilitate the flow of coolant through the MEA stacks in a direction between the first and second ends of the fuel cell, and wherein the coolant passages are arranged so that a region of closest contact between the MEA stacks that is directly coupled by the coolant is a region of lowest electrical potential difference between the at least two MEA stacks.

26. The fuel cell of claim 25, further comprising electrical insulation members between adjacent MEA stacks.

27. The fuel cell of claim 25, wherein the positive and negative electrical connections are arranged at the first end of the fuel cell assembly so that edges of the first and second current collectors are adjacent.

28. The fuel cell of claim 25, wherein the compression member at the second end of the fuel cell comprises coolant inlet and outlet passages coupled to the coolant passages of the MEA stacks.

29. The fuel cell of claim 28, further comprising a coolant manifold at the second end of the fuel cell coupled to the coolant inlet and outlet passages of the compression member at the second end of the fuel cell.

* * * * *

UNITED STATES PATENT AND TRADEMARK OFFICE
CERTIFICATE OF CORRECTION

PATENT NO. : 7,740,962 B2  Page 1 of 1
APPLICATION NO. : 11/567644
DATED : June 22, 2010
INVENTOR(S) : Krzysztof A Lewinski It is certified that error appears in the above-identified patent and that said Letters Patent is hereby corrected as shown below:

Column 9

Line 40; delete "102" and insert -- 102. -- therefor.

Column 20

Claim 22, Line 15; delete "one the" and insert -- one of the -- therefor.

Signed and Sealed this

Thirtieth Day of November, 2010

David J. Kappos
*Director of the United States Patent and Trademark Office*